United States Patent
Kloepfer et al.

(10) Patent No.: US 9,857,133 B1
(45) Date of Patent: Jan. 2, 2018

(54) SYSTEM AND METHOD FOR AUTHENTICATING AN IDENTITY FOR A BIOMETRICALLY-ENABLED GUN

(71) Applicant: Biofire Technologies Inc., Superior, CO (US)

(72) Inventors: Kai Thorin Kloepfer, Boulder, CO (US); Bradley Derek Stapley, San Diego, CA (US); Benjamin Roy Haymond, San Diego, CA (US); Paul Daniel Seiter, San Diego, CA (US)

(73) Assignee: BIOFIRE TECHNOLOGIES INC., Boulder, CO (US)

( * ) Notice: Subject to any disclaimer, the term of this patent is extended or adjusted under 35 U.S.C. 154(b) by 0 days.

(21) Appl. No.: 15/243,678

(22) Filed: Aug. 22, 2016

Related U.S. Application Data

(60) Provisional application No. 62/373,762, filed on Aug. 11, 2016.

(51) Int. Cl.
  *F41A 17/06* (2006.01)
  *G06F 21/32* (2013.01)

(52) U.S. Cl.
  CPC ............ *F41A 17/066* (2013.01); *G06F 21/32* (2013.01)

(58) Field of Classification Search
  CPC ......... F41A 17/06; F41A 17/066; F41A 17/46
  USPC .................................. 42/70.01, 70.06, 70.11
  See application file for complete search history.

(56) References Cited

U.S. PATENT DOCUMENTS

| | | | | |
|---|---|---|---|---|
| 4,467,545 A * | 8/1984 | Shaw, Jr. | ............... | F41A 17/066 42/70.01 |
| 5,062,232 A * | 11/1991 | Eppler | .................. | F41A 17/063 42/70.11 |
| 5,448,847 A * | 9/1995 | Teetzel | .................... | F41A 17/08 42/70.05 |
| 5,946,840 A * | 9/1999 | Mickel | .................... | F41A 17/02 42/70.11 |
| 6,098,330 A * | 8/2000 | Schmitt | ................. | F41A 17/066 382/145 |
| 6,260,300 B1 * | 7/2001 | Klebes | .................. | F41A 17/066 206/317 |
| 6,286,242 B1 * | 9/2001 | Klebes | .................... | F41A 19/58 42/70.01 |
| 6,301,815 B1 * | 10/2001 | Sliwa | .................... | F41A 17/066 42/70.01 |
| 6,412,207 B1 * | 7/2002 | Crye | ........................ | F41A 17/02 42/70.01 |
| 6,421,943 B1 * | 7/2002 | Caulfield | ............... | F41A 17/066 42/70.01 |

(Continued)

*Primary Examiner* — Derrick R Morgan
(74) *Attorney, Agent, or Firm* — Perkins Coie LLP

(57) ABSTRACT

Embodiments of the present invention may include a biometrically-enabled gun. The biometrically-enabled gun may detect a presence of a user. In response to detecting a presence of a user, a processor may be awoken from a power-saving mode. The processor may query for a presence of a finger of a user. A fingerprint image may be captured. A template of the captured fingerprint image may be generated. A correlation between the template and one or more authorized user templates may be determined. In response to the correlation exceeding a threshold, a processor may cause an actuator may unlock the gun. In response to a lapse of user contact with the gun, a processor may cause the actuator to lock the gun.

35 Claims, 16 Drawing Sheets

(56) References Cited

U.S. PATENT DOCUMENTS

| | | | | |
|---|---|---|---|---|
| 6,442,880 B1* | 9/2002 | Allan | F41A 17/066 | |
| | | | 42/66 | |
| 6,678,984 B1* | 1/2004 | Rapp | F41A 17/066 | |
| | | | 42/70.01 | |
| 6,843,014 B1* | 1/2005 | Aponte | F41A 17/06 | |
| | | | 42/70.06 | |
| 8,235,031 B2* | 8/2012 | Kim | F41B 11/57 | |
| | | | 124/77 | |
| 9,032,657 B1* | 5/2015 | Walker | F41A 17/066 | |
| | | | 42/70.11 | |
| 9,441,896 B2* | 9/2016 | Allan | F41A 17/46 | |
| 2002/0170220 A1* | 11/2002 | Recce | B60R 25/04 | |
| | | | 42/70.08 | |
| 2003/0115786 A1* | 6/2003 | Klebes | F41A 17/066 | |
| | | | 42/70.11 | |
| 2003/0136043 A1* | 7/2003 | Lauster | G07C 9/00158 | |
| | | | 42/70.11 | |
| 2005/0000139 A1* | 1/2005 | Mauch | F41A 17/063 | |
| | | | 42/70.01 | |
| 2006/0242879 A1* | 11/2006 | Schmitter | F41A 17/063 | |
| | | | 42/70.01 | |
| 2007/0186457 A1* | 8/2007 | Pitt | F41A 17/06 | |
| | | | 42/70.06 | |
| 2007/0209267 A1* | 9/2007 | Do Amarante | F41A 17/066 | |
| | | | 42/71.01 | |
| 2010/0251881 A1* | 10/2010 | Prytz | F41A 17/16 | |
| | | | 89/14.05 | |
| 2011/0056108 A1* | 3/2011 | McCord | F41A 17/066 | |
| | | | 42/70.01 | |
| 2011/0061280 A1* | 3/2011 | Emde | F41A 17/063 | |
| | | | 42/70.06 | |
| 2012/0090213 A1* | 4/2012 | Pichler | F41A 17/46 | |
| | | | 42/70.06 | |
| 2012/0291326 A1* | 11/2012 | Bova | F41A 17/46 | |
| | | | 42/70.06 | |
| 2013/0118050 A1* | 5/2013 | Alicea | F41A 17/06 | |
| | | | 42/84 | |
| 2014/0366419 A1* | 12/2014 | Allan | F41A 17/06 | |
| | | | 42/70.06 | |
| 2015/0040453 A1* | 2/2015 | Ballard | F41A 17/063 | |
| | | | 42/70.11 | |
| 2016/0054081 A1* | 2/2016 | Creed | F41A 17/066 | |
| | | | 42/70.06 | |
| 2016/0054083 A1* | 2/2016 | Kiyani | F41A 17/063 | |
| | | | 42/70.11 | |
| 2016/0091267 A1* | 3/2016 | Mascorro | G01K 13/002 | |
| | | | 42/70.11 | |
| 2016/0156636 A1* | 6/2016 | Tan | F41A 17/06 | |
| | | | 726/4 | |
| 2016/0341506 A1* | 11/2016 | Steele | F41A 17/063 | |
| 2016/0348994 A1* | 12/2016 | Allan | F41A 17/46 | |
| 2017/0077741 A1* | 3/2017 | Winiecki | H02J 7/025 | |
| 2017/0102199 A1* | 4/2017 | Alicea, Jr. | F41A 19/59 | |
| 2017/0108304 A1* | 4/2017 | Heizer | F41A 21/488 | |
| 2017/0146310 A1* | 5/2017 | Biran | F41A 17/46 | |
| 2017/0205170 A1* | 7/2017 | Milde, Jr. | F41A 17/063 | |

* cited by examiner

SYSTEM AND METHOD FOR AUTHENTICATING AN IDENTITY FOR A BIOMETRICALLY-ENABLED GUN

RELATED APPLICATIONS

The present application claims priority to and benefit from U.S. Provisional Patent Application No. 62/373,762, titled "System and Method for Authenticating an Identity for a Biometrically-enabled gun" and filed on Aug. 11, 2016. The entire content of the provisional application is herein expressly incorporated by reference.

TECHNICAL FIELD

The disclosed teachings relate generally to biometric authentication and verification. Specifically, the disclosed teachings relate to authenticating a user's identity for a biometrically-enabled gun.

BACKGROUND

Ever since the Columbine High School mass shooting in 1999, mass shootings have become so commonplace that Americans have become desensitized to the media coverage of such shootings. According to the data analysis of shootings from 1982 to 2011 performed by the Harvard School of Public Health, mass shootings occurred every 200 days on average. See Amy Cohen, Deborah Azrael, & Matthew Miller, Rate of Mass Shootings Has Tripled Since 2011, Harvard Research Shows, Mother Jones (Aug. 1, 2016). Most recently in 2011, the frequency of mass shootings tripled to every 64 days on average. Id.

Despite shootings to date, such as the Stockton schoolyard in the West to Virginia Tech in the East and such as Sandy Hook Elementary in the North to the Dallas police shooting in the South, Congress has yet to pass any meaningful gun control legislation. But gun control legislation is only half of the solution. Many anti-gun-violence technologists envision a safer world through the increased sale and use of smart guns, which might prevent or at least reduce gun misuse, accidental shootings, gun thefts, use of the weapon against its owner, and self-harm.

SUMMARY

Embodiments of the present invention may include a biometrically-enabled gun configured to authenticate an identity of a user. The biometrically-enabled gun may one or more sensors configured to detect a presence of a user. In response to detecting a presence of a user, a processor within biometrically-enabled gun may be awoken from a power-saving mode. The processor may query a fingerprint sensor for a presence of a finger of a user. A fingerprint image of the finger of the user may be captured. A template of the captured fingerprint image may be generated. A correlation between the captured template and an authorized user template stored in a database may be determined. In response to determining a correlation between the captured template and the authorized user template exceeding a threshold, the processor may cause an actuator to position a counterweighted lever such that the counterweighted lever does not obstruct a trigger bar of the gun. Positioning the counterweighted lever to not obstruct a trigger bar may unlock the gun. The processor may monitor the user's contact with the gun. In response to detecting a lapse in contact with the gun, the processor may cause the actuator to position the counterweighted lever such that the counterweighted lever obstructs the trigger bar of the gun. Positioning the counterweighted lever to obstruct the trigger bar may lock the gun.

The actuator may be affixed to the counterweighted lever such that changes in shape of the actuator cause the counterweighted lever to move about an axis. In an embodiment, the processor may cause a driver to deliver an electrical current to the actuator to change a shape of the actuator and cause the actuator to position the counterweighted lever such that the counterweighted lever does not obstruct the trigger bar of the gun. In an embodiment, the processor may cause the driver to terminate delivery of the electrical current to the actuator to change a shape of the actuator and cause the actuator to position the counterweighted lever such that the counterweighted lever obstructs the trigger bar of the gun.

DETAILED DESCRIPTION

The embodiments set forth below represent the necessary information to enable those skilled in the art to practice the embodiments, and illustrate the best mode of practicing the embodiments. Upon reading the following description in light of the accompanying figures, those skilled in the art will understand the concepts of the disclosure and will recognize applications of these concepts that are not particularly addressed here. It should be understood that these concepts and applications fall within the scope of the disclosure and the accompanying embodiments.

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, refer to any connection or coupling, either direct or indirect, between two or more elements. The coupling or connection between the elements can be physical, logical, or a combination thereof.

As used herein, the terms "firearm" or "gun" may refer to a gun, rifle, pistol, handgun, revolver, Taser®, bow and arrow, or any other dischargeable-projectile weapon including but not limited to weapons that discharge electrical currents or sprays. The technology disclosed herein may be removably-attached to said weapon or may be partially-embedded or permanently-embedded to said weapon.

As used herein, the terms "gun owner," "owner," "administrator," "initial user," and "user" may refer to a user who holds a license to use the technology disclosed herein or who otherwise may utilize the technology disclosed herein.

The disclosed embodiments include methods and systems for activating a biometrically-enabled gun for immediate use and discharge.

Figure 1:
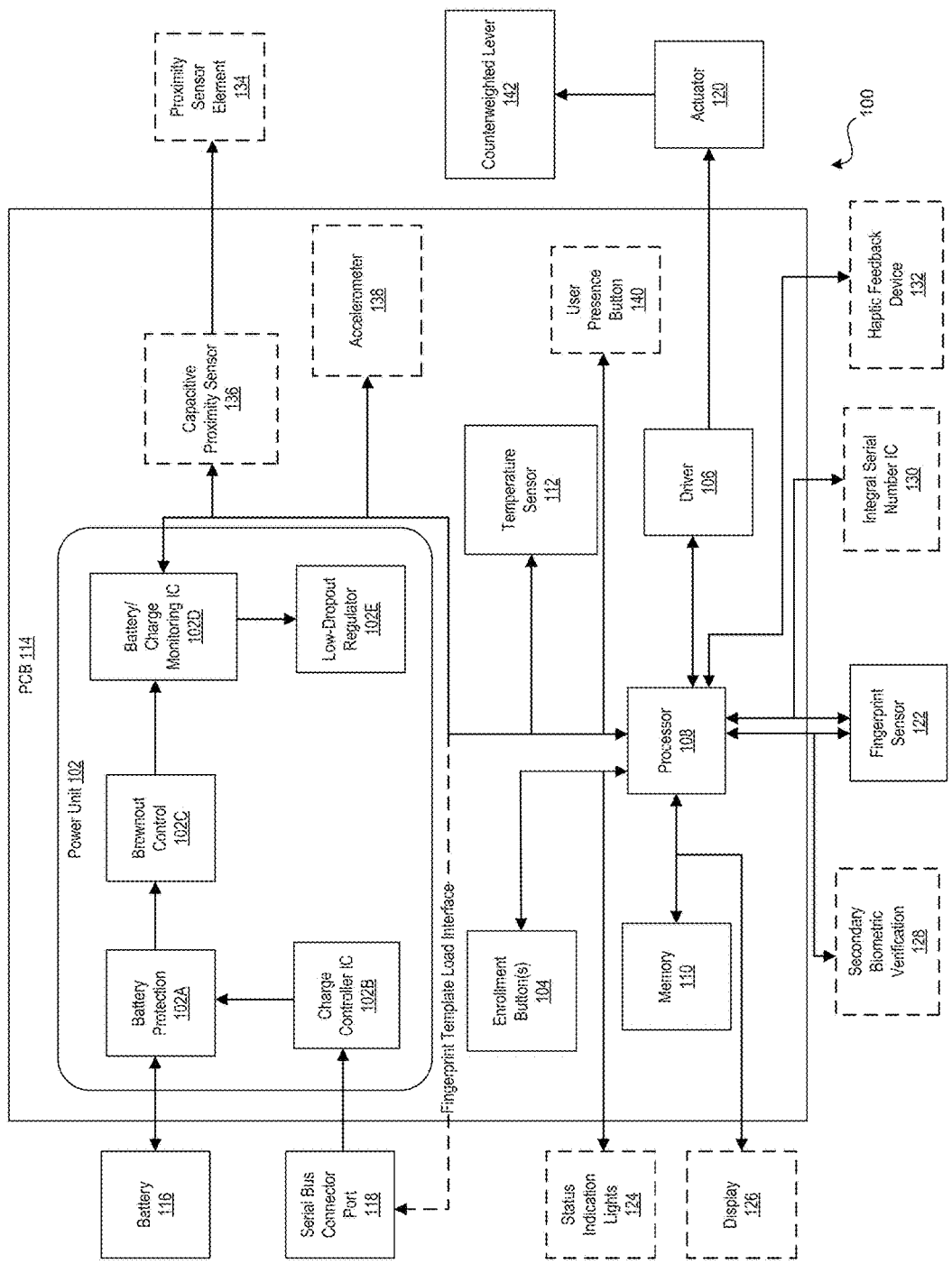
FIG. 1 is a block diagram illustrating a system for authenticating a user's identity for a biometrically-enabled gun, according to some embodiments of the present disclosure.

FIG. 1 is a block diagram of a system 100 that can activate a biometrically-enabled gun. According to one embodiment of the invention, the system 100 for activating a biometrically-enabled gun may comprise a power unit 102, one or more enrollment buttons 104 wherein one or more status indication lights may indicate the status of said enrollment, a driver 106, a processor 108, memory 110, and a temperature sensor 112. According to some embodiments of the invention, the power unit 102 may comprise a battery protection apparatus or module 102A, a charge controller integrated circuit 102B, a brownout control apparatus or module 102C, a battery/charge monitoring integrated circuit 102D, and a low-dropout regulator 102E. In one embodiment, the power unit 102, one or more enrollment buttons 104, a driver 106, a processor 108, memory 110, and a temperature sensor 112 may exist on a printed circuit board (PCB) 114. According to some embodiments of the invention, the system 100 further comprises a battery 116, a serial bus connection port 118 (e.g., Micro-USB controller port), an actuator 120, and a fingerprint sensor 122.

According to embodiments of the invention, the system 100 may optionally comprise one or more status indication lights 124, a display 126, a secondary biometric verification sub-system 128, an integral serial number integrated circuit 130, and a haptic feedback device 132 (e.g., a vibrator motor), and a proximity sensor element 134. According to other embodiments, the system 100 may optionally further comprise a capacitive proximity sensor 136, an accelerometer 138, and a user presence button 140, wherein the capacitive proximity sensor 136, the accelerometer 138, and the user presence button 140 may exist on the PCB 114.

According to one embodiment, when a user picks up a firearm comprising system 100, the user activates one or more user-presence detection systems, including, but not limited to, the system 100 itself, the proximity sense element 134, the user presence button 140, the capacitive proximity sensor 136 and/or the accelerometer 138 (collectively hereinafter "the detection systems"). These detection systems wake the processor 108 from a deep sleep state, e.g., a power-saving mode, and the processor 108 in turn activates the fingerprint sensor 122 to start querying for presence of a finger and/or the secondary biometric verification system 128 according to predefined settings of that system. In some embodiments, the activated detection systems also activate the status indicators 124 and/or display 126, both visible on the firearm while gripped, to show, for instance, the remaining battery life for the system 100 and other status updates.

According to one embodiment that uses a standard handgun grip, the user's middle finger naturally lands on the capacitive fingerprint sensor 122 incorporated into the grip of the firearm. This sensor captures a three-dimensional map of unique attributes of their fingerprint (e.g., the mapping of the fingerprint's "ridges and valleys"), which is then transferred into the memory 110 of the processor 108 for analysis. However, in other embodiments, the fingerprint sensor 122 may be placed in other locations along the handgun grip to capture fingerprints of other fingers of the user. The detection systems may not necessarily require the use of the user's middle finger, but may be configured to use the fingerprints of the user's remaining fingers as well (e.g., thumb, index finger, fifth-digit (pinkie) finger, etc.). According to one embodiment, the sensor may be placed such that it reads a part of the user's hand (e.g., the user's palm) instead of the user's fingers.

According to embodiments of the invention, the captured image is converted using an algorithm to generate a template that uniquely represents the fingerprint of a user A. The template of user A is then compared against the templates within a database of authorized users, wherein at least one fingerprint of each authorized user is represented by a template. The database of authorized users is stored via encryption or hashing in a secure enclave, fully-encrypted external memory, or some other secure storage medium.

If the captured fingerprint template of User A does not match a template within the database of authorized users, the failed authentication is discretely indicated through at least one of the status indication lights 124, display 126, haptic feedback device 132, and the system 100 returns to looking for a valid fingerprint.

If the captured fingerprint template of User A does match a template within the database of authorized users, the successful authentication is discretely indicated through at least one of the status indication lights 124, display 126, and haptic feedback device 132.

An Actuator to Change a Position of a Counterweighted Lever

If the captured fingerprint template of User A matches a template within the database of authorized users, the processor 108 may cause an actuator 120 to change a position of a counterweighted lever 142. For example, the processor 108 may transmit activate a driver 106, and the driver 106 may cause the actuator 120 to change a position of the counterweighted lever 142.

In an embodiment, the actuator 120 may control movement of a counterweighted lever 142. For example, the actuator 120 may change a position of a counterweighted lever 142 to block and/or unblock movement of a trigger bar of a weapon. The actuator 120 may be, for example, a shape memory device, solenoid, electric motor (e.g., a direct current motor, electrostatic motor, and/or servo motor), electromagnet, piezoelectric actuator, voice coil, or any combination thereof.

In a preferred embodiment, the actuator 120 may be a shape memory device. The shape memory device may return to a pre-deformed shape when heated. A shape memory device may occupy less space than other actuators, enabling the device to be included in a handle of a weapon having ordinary dimensions. Other actuators, such as, for example, a servo motor may occupy substantially more space than a shape memory device and require dimensions greater than dimensions of an ordinary handheld weapon. In addition, actuators other than a shape memory device may weigh substantially more making them less practical in a handheld weapon. In contrast, shape memory device may be lightweight and not add a noticeable amount of weight to a handheld weapon. Many actuators may cause vibrations (e.g., electric motor actuators) that may disturb the function of the weapon, whereas shape memory device may cause little to no vibration.

Deformation and relaxation of the shape memory device may be dependent on a temperature of the shape memory device. Embodiments include heating the shape memory device by heating an element adjacent to the shape memory device and/or heating the shape memory device directly. In an example, the shape memory device may be heated using an adjacent heating mechanism, such as, for example, an adjacent coil having a resistance to an electric current to generate heat. In another example, the shape memory device may be a wire configured to receive a current. The shape memory device may be designed to have a particular electrical resistance such that the shape memory device may be heated by a known amount when an electrical current is applied to the shape memory device. The shape memory device may relax (i.e. return to a pre-deformed shape) when current is applied and return to a deformed shape when current is not applied. The shape memory device may receive an electrical current from the driver 106.

In an embodiment, the shape memory device may be insulated from an ambient temperature using, for example, a composite polymer material (e.g., ethylene propylene diene monomer rubber). A composite polymer material having dielectric and viscoelastic may provide additional benefits of electrically insulating the shape memory device and adjusting to shape changes of the shape memory device. In an embodiment, the driving current may be modulated in response to the ambient temperature as reported by, for example, an onboard temperature sensor 112 and/or a wireless transmission device configured to receive ambient temperature data.

The shape memory device may be composed of, for example, a shape memory alloy, shape memory polymer, or a combination thereof. For example, the shape memory device may be composed of a metal having a fully reversible crystal transformation after heating. In an embodiment, the shape memory device may be composed of any combination of, for example, nickel, titanium, copper, aluminum, nickel, zinc, gold, manganese, silicon, tin, platinum, and iron. For example, the shape memory device may include a shape memory alloy, such as, for example, nickel titanium (also referred to as nitinol and NiTi), copper nickel titanium, copper-aluminum-nickel, copper-zinc-aluminum, iron-manganese-silicon, copper-zinc-aluminum-nickel, or any combination of thereof. In an embodiment, the shape memory device may be composed of a shape memory polymer such as, for example, polyurethane-based shape-memory polymers with ionic or mesogenic components, polyethylene-terephthalate-polyethyleneoxide (PET-PEO) block copolymer crosslinked using maleic anhydride, or a combination thereof.

The shape memory device may include an impurity (or impurities) to adjust, for example, a transition initiation temperature ($A_s$) for thermally activating the shape memory alloy. For example, trace amounts of oxygen and/or carbon may be included to reduce the transition initiation temperature. In another example, including niobium may increase a transition initiation temperature. The transition initiation temperature may also be altered by small changes in composition (i.e. proportion changes of various elements) and/or heat treatments during the manufacturing process.

The shape memory device may have one or more temperature dependent phases including, for example, an austenite phase and a martensite phase. The austenite phase may be a higher temperature phase where the shape memory alloy may have a cubic crystalline structure. The martensite phase may be a lower temperature phase where the shape memory alloy may have a twinned crystal structure. The transition initiation temperature ($A_s$) (also referred to as austenite start temperature) is defined as the temperature at which the phase transformation from martensite to austenite is initiated during heating of the shape memory alloy. The austenite finish temperature ($A_f$) is defined as the temperature at which the transformation from martensite to austenite finishes on heating. The martensite start temperature ($M_s$) is defined as the temperature at which the transformation from austenite to martensite begins on cooling. The martensite finish temperature ($M_f$) is defined as the temperature at which the transformation from austenite to martensite finishes on cooling. Generally speaking, $M_s$ and $M_f$ are substantially lower than $A_f$ and $A_s$.

In an embodiment, the shape memory device may have a transition initiation temperature ($A_s$) greater than ambient air temperature. In an embodiment, the shape memory device may have a transition initiation temperature ($A_s$) and a martensite finish temperature ($M_f$) greater than ambient air temperature. The highest recorded ambient air temperature on Earth is 134° F. (56.7° C.) in Death Valley, Calif. The shape memory device may be designed to have a transition initiation temperature ($A_s$) and/or martensite finish temperature ($M_f$) greater than 134° F. (56.7° C.). For example, a nickel titanium alloy having a niobium addition may result in a transition initiation temperature ($A_s$) and a martensite finish temperature ($M_f$) greater than 134° F. (56.7° C.). In an embodiment, the niobium addition may range from approximately 1 atomic percent to approximately 40 atomic percent, and ranges therebetween. For example, the niobium percentage may be approximately 3 atomic percent.

The actuator 120 may be used to reposition the counterweighted lever 142. In an example, a counterweighted lever 242 (FIG. 2C) may obstruct movement of a trigger bar 246 (FIG. 2E), an integral part of a semi-automatic handgun. This trigger bar 246 may connect the trigger 244 (FIG. 2D) to the striker in a firearm. When the trigger bar 246 moves, it initiates the process that results in ammunition being fired. In the deactivated state, this counterweighted lever 242 may be held up by a coiled spring 250 (FIG. 2E) or an electromechanical element (not shown), blocking the movement of the trigger bar 246. A processor may cause the actuator 120 to reposition the counterweighted lever 142 (e.g., the counterweighted lever 242 of FIG. 2C) such that the trigger bar 246 is free to move and the gun is able to fire ammunition. For example, the processor 108 may initiate the driver 106 causing the driver 106 to deliver an electric current to the actuator 120. The actuator 120 may be affixed to the counterweighted lever 142 (e.g., attached to one or more grooves 242E of a lever arm 242D as shown in FIG. 2J) such that changes in shape of the actuator 120 cause the counterweighted lever 142 to move about an axis (e.g., fulcrum rod 248) so that a portion of the counterweighted lever 142 (e.g., trigger-bar contact member 242B) may be positioned to obstruct or not obstruct movement of a trigger bar (e.g., trigger bar 246). The actuator 120 (e.g., a shape memory alloy) may be heated by the electric current delivered from the driver 106 causing the actuator to change shape, and thus, changing a position of the counterweighted lever 142. For example, the actuator 120 may pull the lever arm 242D so that the trigger-bar contact member 242B does not obstruct a trigger bar 246 (i.e. unlocking the gun). Heating of the actuator 120 (e.g., a shape memory alloy) may be terminated by stopping delivery of an electric current by the driver 106 causing the actuator 120 to revert to a previous shape, and thus, changing a position of the counterweighted lever 142. For example, the actuator 120 may change shape such that a force of a spring may pull the counterweighted lever 242 into a position obstructing the trigger bar 246 (i.e. locking the gun).

After the firearm is activated (e.g., a current is delivered to the actuator 120), the firearm may remain in an unlocked state for as long as the user continues to grip the firearm (monitored by, e.g., a low-power processor of a detection system) by continuing to supply current to the actuator 120. If a lapse in user contact is detected (e.g., the user loses his grip on the firearm due to holstering the gun, setting the gun down, forcibly losing the gun to an assailant, etc.), the system 100 may terminate current to the actuator 120 by deactivating driver 106 and, as a result, the actuator 120 relaxes, causing the firearm to return to a locked state.

Biometric Database and Energy Management

When an initial user or owner purchases a commercial smart gun, the memory 110 of the firearm may be stripped (i.e., wiped and/or erased) of all fingerprint templates. The initial user then may need to register his or her fingerprint into the memory 110 to create an administrator profile (hereinafter "admin") who can both unlock the firearm, enroll, and remove the templates of one or more other users.

In some embodiments, the admin may be guided through the process either by written instructions and the status indication lights 124 or a display 126, if equipped. The admin may provide user input through the one or more enrollment button(s) 104 and/or through the display 126. This enrollment process captures multiple images of the admin's fingerprint and combines them to create a template which is then stored in a secure database in the memory 110.

According to some embodiments, besides activating the firearm, the admin may enroll or remove other users. The enrollment/removal process is similar to the initial enrollment process but requires the admin to authenticate his or her identity using his or her fingerprint before initiating the process of enrolling or removal of the fingerprint templates of the other users.

According to some embodiments, the owner or admin can also initiate a sell procedure which, after authentication, resets the firearm to a factory default state, allowing the enrollment of a new owner and guaranteeing to the new owner that the fingerprint templates have been stripped (i.e., wiped and/or erased) from the previous owner.

According to some embodiments, the system 100 may further comprise a fingerprint template load interface module interfacing between the system 100 via the serial bus connector port 118 and an external computing device, such as a computer, for professional use (e.g., law enforcement use, military use, etc.). According to some embodiments, where the commercial version of the firearm has no communication interfaces to reduce attack surface, the professional version of the firearm comes equipped with a secured wired communication interface via the serial bus connector port 118 that allows connection to an external computer. This wired interface communicates with a verification program running on the computer that allows mass enrollment and modification of the fingerprint templates stored on the firearm.

By connecting this program to an existing personnel database and capturing a fingerprint template to associate with each user, an administrator in an organization can use the program to simultaneously upload any number of templates to any number of firearms. For example, fingerprint templates for any military unit (e.g., a battalion, company, platoon, squad, section, patrol, etc.) may be stored on firearms available to the military unit. This capability may allow an entire military unit to use any firearm assigned to a member of the military unit but prevent any non-member from using those firearms. Various embodiments for bulk enrollment of authorized users are discussed below with reference to FIGS. 4A-4B.

Because biometric verification data (e.g., fingerprint data, retina scan data, etc.) are stored on the PCB, an attacker could theoretically purchase a new firearm, register their biometric data with that gun, remove the PCB, and place it into another gun. The external serial number and appearance of the modified gun would not change, but the attacker could authenticate his own identity instead of the owner. According to some embodiments, the system 100 comprises a integrated serial number integrated circuit 130 that addresses this problem. By mechanically integrating a small IC into the plastic body of the firearm that provides a unique serial number when queried, the PCB 114 may be prevented from working in any other firearm than the one in which it was originally shipped. With the inclusion of this integrated serial number integrated circuit 130, the substitute PCB would not receive the correct serial number and would shut down, reducing the possibility of intentional misuse.

The system 100 may include any energy storage technology known in the art, such as, for example, an electrochemical device (e.g., a battery), an electrical device (e.g., a capacitor), a mechanical device (e.g., compress air, flywheel, etc.), a thermal device, a chemical device, or any combination of energy storage devices. Embodiments of the present invention may include wired or wireless charging for the one or more energy storage devices. For example, an connection mechanism (e.g., connection mechanism 405 discussed in FIG. 4A-4B) may be used to charge the one or more energy storage devices. Some embodiments include a battery as an energy storage device. As with any electronic device powered by a battery, there are a number of considerations which may be taken to maintain the integrity of the battery. The battery's health and state of charge may be monitored at all times and a battery pack may be protected from any overage or undersupply of current or voltage by a battery protection apparatus or module 102A. In some embodiments, a specifically-designed charger 102B for the chemistry and cell type may be onboard, powered via a serial bus interface connection port 118 configured to connect to a connection mechanism (e.g., connection mechanism 405). In some embodiments, the battery (or other energy storage device) may be physically protected against flying sparks and other possibly damaging items by a physical barrier.

By monitoring the state of charge, the system 100 is able to alert the user to the current battery level with the status indication lights 124, display 126, haptic feedback device 132, or any combination thereof and take necessary fail-safe precautions if the battery level falls. For consumer versions of the firearm, the default mode may be fail secure. If the user ignores all battery warnings, the system 100 will detect the impending low-voltage condition (brownout) and shut itself off until the battery 116 is charged. For professional versions of the firearm, the default mode may be fail safe. If the user ignores all battery warnings, the system 100 may detect the impending low voltage condition (i.e., a brownout), and unlock the system 100 to revert the firearm back into a manual firearm until it is charged. Both of these defaults may be user-configurable by the end-consumer should one particular mode be preferred over the other mode.

Primary and Secondary Biometric Verification

In an embodiment, the fingerprint sensor 122 may be a primary biometric verification device, and one or more other devices may provide secondary biometric verification. In an embodiment, the fingerprint sensor 122 may detect a fingerprint of a user. The fingerprint sensor 122 may detect a fingerprint in contact with the fingerprint sensor 122, detect a fingerprint through another material, or receive a data transmission of a fingerprint of a user. According to some embodiments of the invention, the user may wear a glove comprised of conductive material (e.g., conductive material in the fingertips that allows fingerprint sensing through the material), allowing the user to wear gloves and simultaneously be able to activate the firearm.

According to embodiments of the invention, in addition to the fingerprint sensor, other user authentication methods may be used to verify user identity that could be integrated in as a secondary fail-safe or an alternative method to activate the gun. According to some embodiments of the invention, in the case where the fingerprint sensor is obscured or non-functional, such as if the user is wearing traditional gloves (e.g., gloves obscuring a fingerprint) or if the sensor is sufficiently wet to prevent accurate image capture, a secondary authentication may be used to unlock the firearm. Examples of secondary authentication include another fingerprint sensor (e.g., within a glove worn by a user), a retinal scan, iris scan, voice identification, RFID, grip recognition, palm vein scan, biological sample test, or any combination thereof. Various embodiments of secondary authentication methods are described below. A secondary biometric verification device may be included, for example, in clothing (e.g., a glove) worn by a user and/or in the biometrically-enabled gun.

A retinal scan device may be included in the biometrically enabled firearm. Individual's retinas may be unique due to the complex structure of capillaries that supply the retina with blood. In an embodiment, an unperceived beam of low-energy light (e.g., infrared light) may be transmitted toward a user to illuminate a retina of the user. In an embodiment, the retinal scan device may include an optical instrument for recording or capturing images of a user's retina. Patterns of a user's retina blood vessels may be detected in the images and compared to a user database. The processor may execute a matching algorithm to determine if the captured retinal patterns match stored retinal patterns associated with an authorized user. If the processor determines that a match exists, the processor may activate the driver 106 to cause the actuator 120 to change a position of the counterweighted lever 142 such that the counterweighted lever 142 is no longer a barrier to movement of the trigger bar.

An iris scan device may be included in the biometrically enabled firearm. Individual's irises may include unique coloration patterns in various wavelengths of light (e.g., visible spectrum, infrared, etc.). In an embodiment, a beam of light (e.g., visible spectrum, infrared, etc.) may be transmitted toward a user to illuminate an iris of the user. In an embodiment, the iris scan device may include an optical instrument for recording or capturing images of a user's iris. Detailed patterns of various colors and structures may be detected in the images and compared to a user database. The processor may execute a matching algorithm to determine if the captured iris patterns match stored iris patterns associated with an authorized user. If the processor determines that a match exists, the processor may activate the driver 106 to cause the actuator 120 to change a position of the counterweighted lever 142 such that the counterweighted lever 142 is no longer a barrier to movement of the trigger bar.

In an embodiment, the retinal scan device and the iris scan device may both be included in the biometrically enabled firearm and operate in conjunction with one another. For example, infrared light may be transmitted toward an eye of a user and an imaging device may capture both images of the user's retina blood vessels and images of the user's iris. Patterns may be detected in the retina images and the iris images. Patterns of retina images may be compared to a stored retina images, and patterns of iris images may be compared with stored iris images. The processor may execute a matching algorithm based on both sets of images (retina images and iris images) to determine if the images match with stored patterns associated with an authorized user. If the processor determines that a match exists, the processor may activate the driver 106 to cause the actuator 120 to change a position of the counterweighted lever 142 such that the counterweighted lever 142 is no longer a barrier to movement of the trigger bar.

Using a combination of a retinal scan and an iris scan may make compromising the scanning device substantially more difficult. A conventional retinal scan may have measurement inaccuracies resulting from eye disease (e.g., cataracts) and severe astigmatism. The measurement inaccuracies in a retinal scan may result in an inconclusive match, which can be augmented by a clear match from an iris scan. A conventional stand-alone iris scanner may identify patterns in a high quality image of an iris of an authorized user and determine that a match exists. However, by performing a retinal scan in combination with an iris scan, a high quality image of an iris may match iris images but not retinal images, thus enabling the processor to determine that a match does not exist.

A voice identification device may be included in the biometrically enabled firearm. The voice identification device may include a microphone and a voice print database storing a voice print of at least one authorized user. The processor may receive data associated with an utterance of a user from the microphone and verify or authenticate the user based on a voice print associated with an authorized user in the voice print database. The processor may identify a user, among a plurality of authorized users, based on a voice print associated with an authorized user in the voice print database.

An RFID reader may be included in the biometrically enabled firearm. In an embodiment, an RFID tag may be attached to a glove of a user, worn as a bracelet or ring, or implanted in a user (e.g., under the skin of a hand). The RFID tag may contain electronically stored authentication information. The RFID reader may be incorporated in the biometrically enabled firearm. In response to a failure to read a fingerprint by the fingerprint sensor 122, the RFID reader may transmit radio waves and the RFID tag may receive radio waves to generate energy. The RFID tag may use generated energy from the received radio waves to transmit data associated with electronically stored authentication information to the RFID reader affixed to the biometrically enabled firearm. The biometrically enabled firearm may receive the authentication information from the RFID tag. A processor of the biometrically enabled firearm may execute a matching routine to determine if the received authentication information matches information associated with an authorized user.

A grip recognition device may be included in the biometrically enabled firearm. The grip recognition device may include a plurality of sensors to determine a size and structure of a user's hand. The plurality of sensors may also determine a pressure applied to the biometrically enabled gun by the user's hand. Size, structure, and/or pressure data may be analyzed to identify size, structure, and/or pressure patterns associated with the user handling the biometrically enabled firearm. A processor of the biometrically enabled firearm may execute a matching algorithm to determine if a match exists between the identified patterns and stored patterns associated with an authorized user.

In an embodiment, a palm vein scanning device may be included in the biometrically enabled firearm. In an embodiment, the palm vein scanning device may be included in a glove worn by a user. A palm vein scanning device may function similarly to a retinal scanner in that it may transmit infrared light and detect vein patterns. In an embodiment, the palm vein scanning device may also be a retinal scanning device. In an embodiment, an unperceived beam of low-energy light (e.g., infrared light) may be transmitted toward a user to illuminate a palm of the user. In an embodiment, the palm vein scanning device may include an optical instrument for recording or capturing images of a user's palm (including, e.g., veins, arteries, capillaries, etc. in the user's palm). Patterns of a user's palm blood vessels may be detected in the images and compared to a user database. The processor may execute a matching algorithm to determine if the captured palm patterns match stored palm patterns associated with an authorized user. If the processor determines that a match exists, the processor may activate the driver 106 to cause the actuator 120 to change a position of the counterweighted lever 142 such that the counterweighted lever 142 is no longer a barrier to movement of the trigger bar.

Biological sample testing device may be included in the biometrically enabled firearm. The biological sample testing device may test for various biological markers such as, for example, deoxyribonucleic acid (DNA), ribonucleic acid (RNA), protein (e.g., an antibody), hormone, etc. Biological markers including extensive information (e.g., DNA and RNA) may be analyzed by focusing on standardized portions of the biological markers. For example, the biological sample testing device may receive a biological sample from a human user (e.g., skin cells, blood, etc.) and identify one or more portions of a DNA sequence in the sample. The one or more portions of the DNA sequence that are identified may be standardized so that the one or more portions of the DNA sequence tested can be compared to data associated with corresponding portions of DNA previously tested. By testing standardized portions of the DNA sequence, rather than the entire DNA sequence, testing and verification of a user can be performed rapidly. The processor may execute a matching algorithm to determine if the tested standardized portions match stored standardized portions associated with an authorized user. If the processor determines that a match exists, the processor may activate the driver 106 to cause the actuator 120 to change a position of the counterweighted lever 142 such that the counterweighted lever 142 is no longer a barrier to movement of the trigger bar.

Various Views of a Biometrically-enabled gun

Figure 2A:
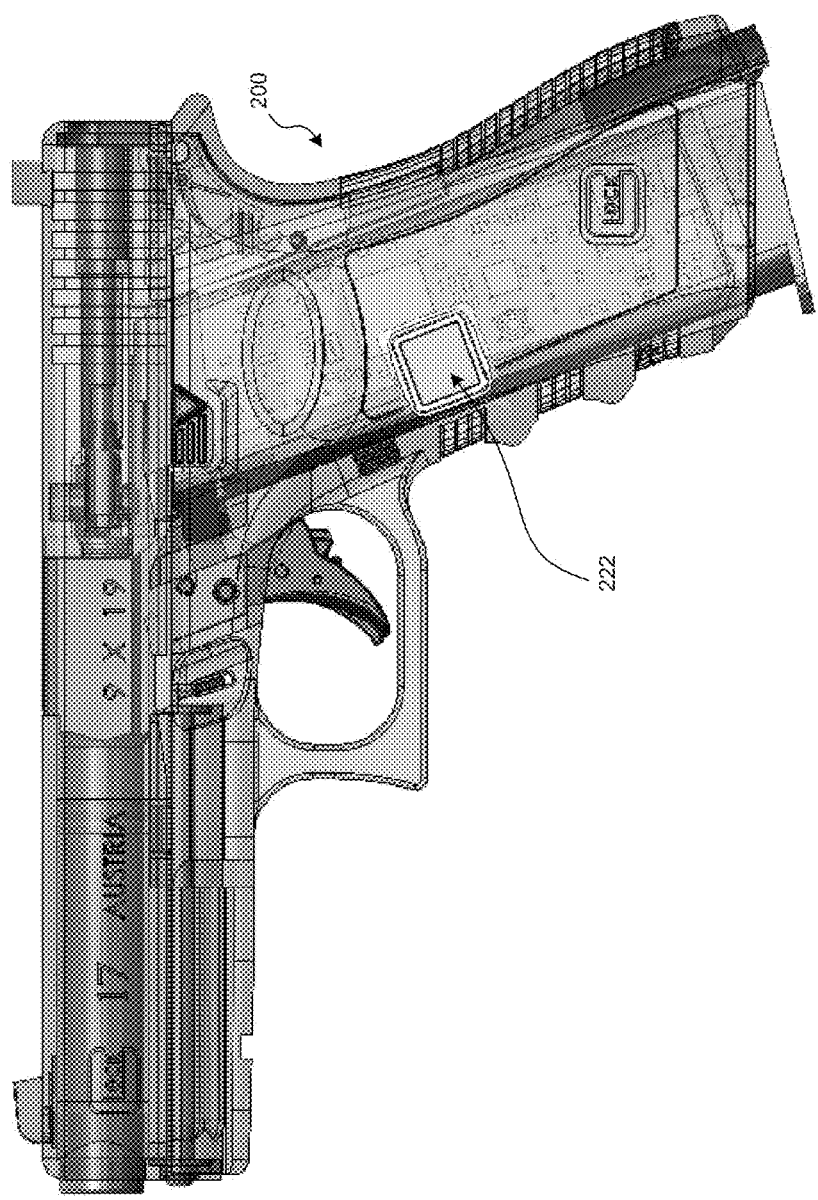
FIG. 2A shows a perspective side view of an example of the biometrically-enabled gun, according to some embodiments of the present disclosure.
Figure 2B:
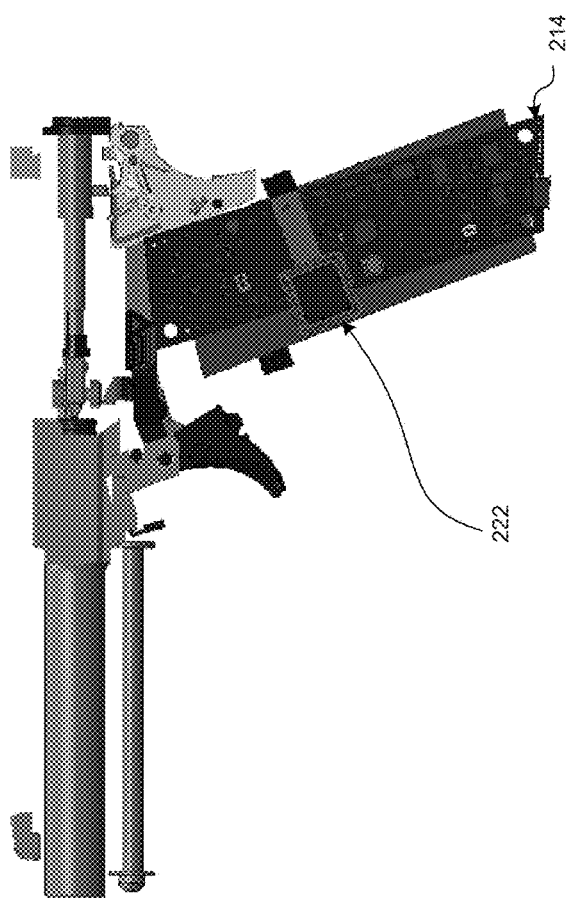
FIG. 2B shows a partially-deconstructed perspective side view of the biometrically-enabled gun, according to some embodiments of the present disclosure.

FIG. 2A shows a perspective side view of an example of a biometrically-enabled gun 200, according to some embodiments of the present disclosure. According to some embodiments, the biometrically-enabled gun 200 comprises a fingerprint sensor 222, flush with the magazine housing of the biometrically-enabled gun 200. FIG. 2B is a partially-deconstructed perspective side view of the example biometrically-enabled gun 200 for a clearer view of the system for authenticating a user's identity for a biometrically-enabled gun, including a PCB 214 and the fingerprint sensor 222, according to some embodiments of the present disclosure. In some embodiments, the PCB 214 is removably attached to and substantially located within the magazine housing of the biometrically-enabled gun 200.

Figure 2C:
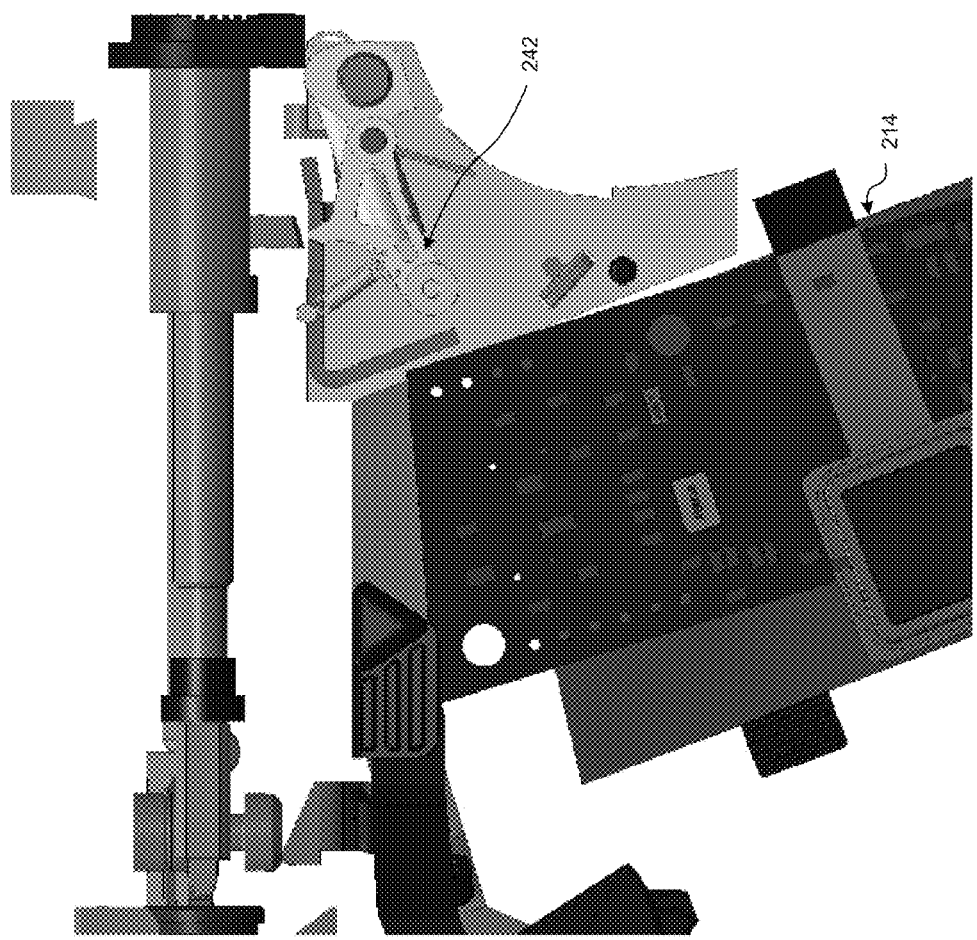
FIG. 2C shows a partially-deconstructed view of a system for authenticating a user's identity for the biometrically-enabled gun, according to some embodiments of the present disclosure.
Figure 2D:
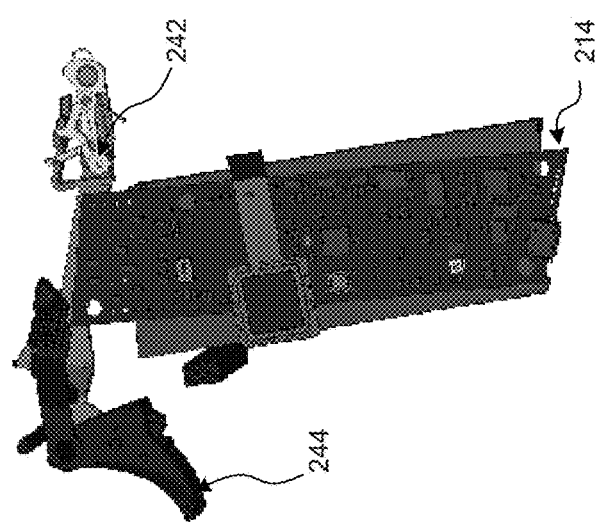
FIG. 2D shows yet another partially-deconstructed view of a system for authenticating a user's identity for the biometrically-enabled gun, according to some embodiments of the present disclosure.

FIG. 2C shows another partially-deconstructed view of a system for authenticating a user's identity for the example biometrically-enabled gun, including a PCB 214 and a counterweighted lever 242, according to some embodiments of the present disclosure. The counterweighted lever 242 is also substantially located within the biometrically-enabled gun 200. An example actuator (e.g., shape memory alloy) for the smart gun is not shown but connects from the PCB 214 at the bottom of the firearm to the counterweighted lever 242. FIG. 2D is yet another partially-deconstructed view of a system for authenticating a user's identity for a biometrically-enabled gun, primarily showing a trigger 244 and the components comprising a system for authenticating a user's identity for a biometrically-enabled gun, according to some embodiments of the present disclosure.

Figure 2E:
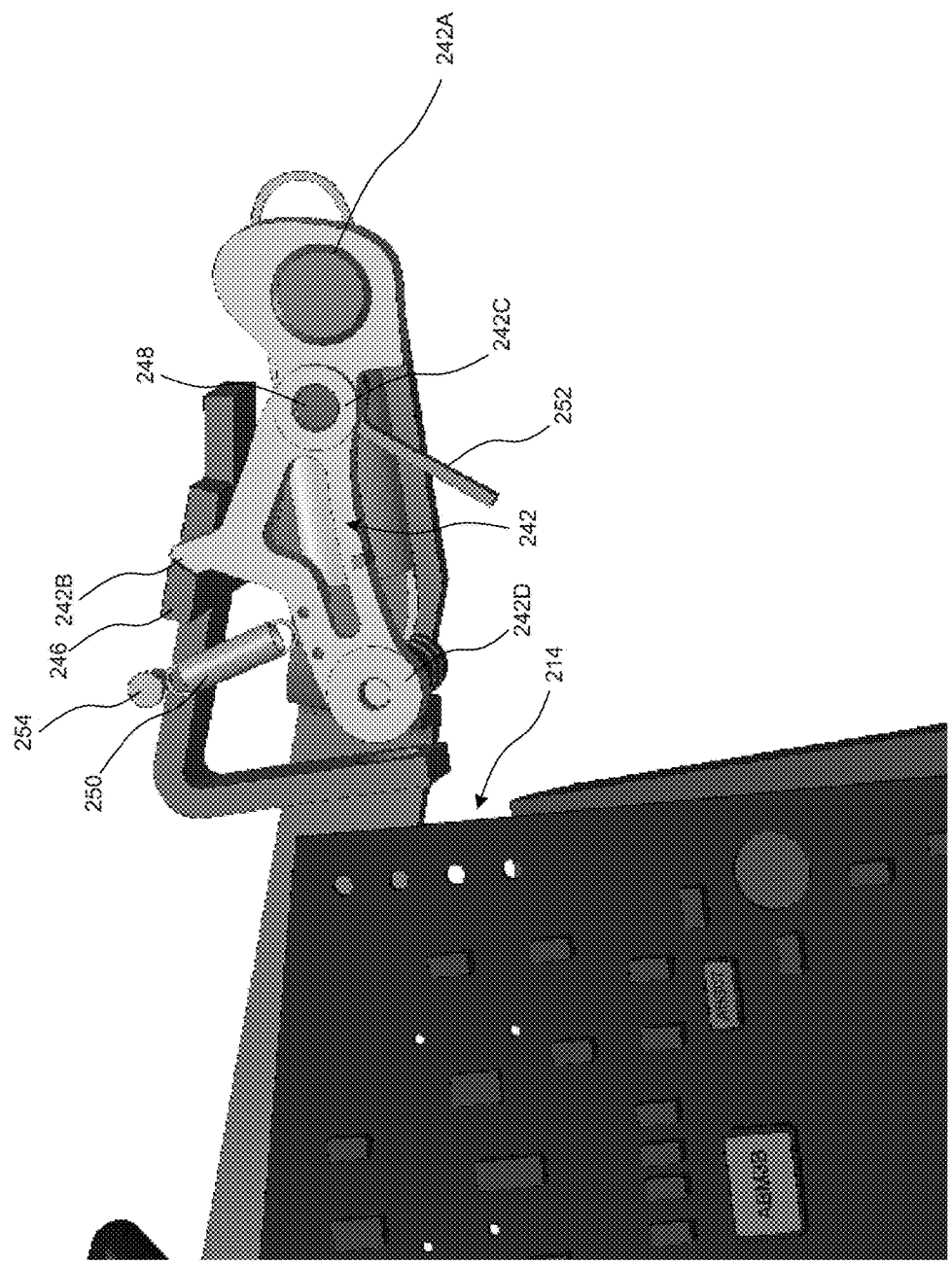
FIG. 2E shows a partial view of a system for authenticating a user's identity for a biometrically-enabled gun including a counterweighted lever for blocking the movement of a trigger bar of the biometrically-enabled gun, according to some embodiments of the present disclosure.

FIG. 2E shows a partial view of a system for authenticating a user's identity for an example biometrically-enabled gun 200 including the counterweighted lever 242 for blocking the movement of a trigger bar 246 of said biometrically-enabled gun 200, according to some embodiments of the present disclosure. The counterweighted lever 242 further comprises a weight 242A, trigger-bar contact member 242B, a pivot 242C, and a lever arm 242D, all of which may be manufactured and comprised as one piece or an assembly comprising multiple pieces. When the system for authenticating a user's identity for the biometrically-enabled gun 200 is in a locked state (i.e., not activated), the trigger-bar contact member 242B substantially contacts the trigger bar 246, preventing any firing of ammunition. Unless restricted by a coiled spring 250 (or an equivalent electromechanical actuator) or the trigger bar 246, the counterweighted lever 242 may freely rotate about the pivot 242C. The pivot 242C receives a fulcrum rod 248, wherein the fulcrum rod 248 is securely mounted to the housing of the biometrically-enabled gun 200 and the counterweighted lever 242 may rotate freely about the fulcrum rod 248. One of the ends of each, a leaf spring 252 and the coiled spring 250, may be removably attached to or may be welded or otherwise embedded to the counterweighted lever 242. The remaining ends of the leaf spring 252 and the coiled spring 250 may be impinged against the housing of the biometrically-enabled gun 200 or mounted to a fixed point 254 within the biometrically-enabled gun 200.

Figure 2F:
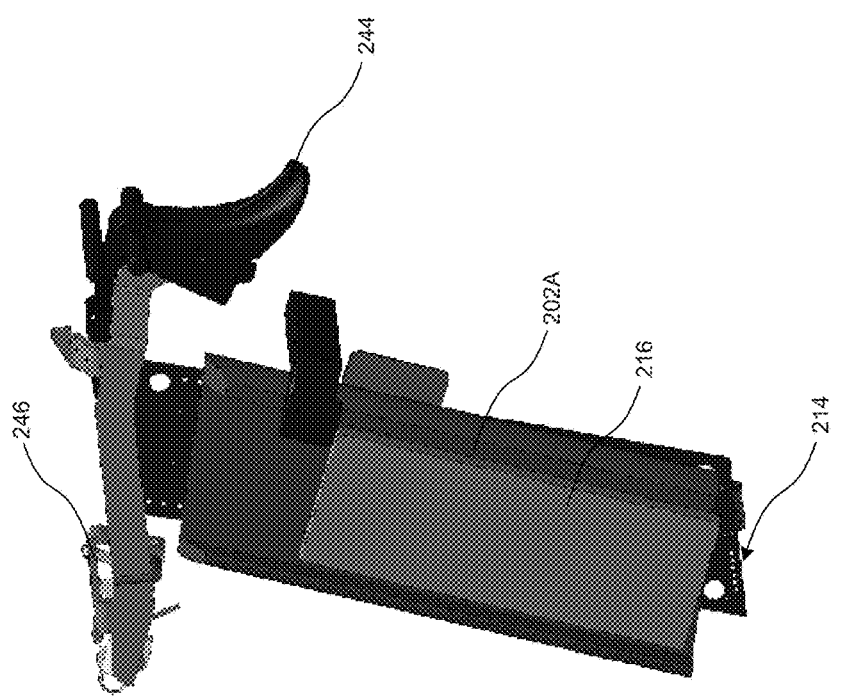
FIG. 2F shows yet another partial view of a system for authenticating a user's identity for the biometrically-enabled gun, according to some embodiments of the present disclosure.

FIG. 2F shows yet another partially-deconstructed perspective view of a system for authenticating a user's identity for the example biometrically-enabled gun 200, according to some embodiments of the present disclosure. The PCB 214 is powered by a battery 216 and shielded against flying sparks by the physical barrier or module 202A.

Figure 2G:
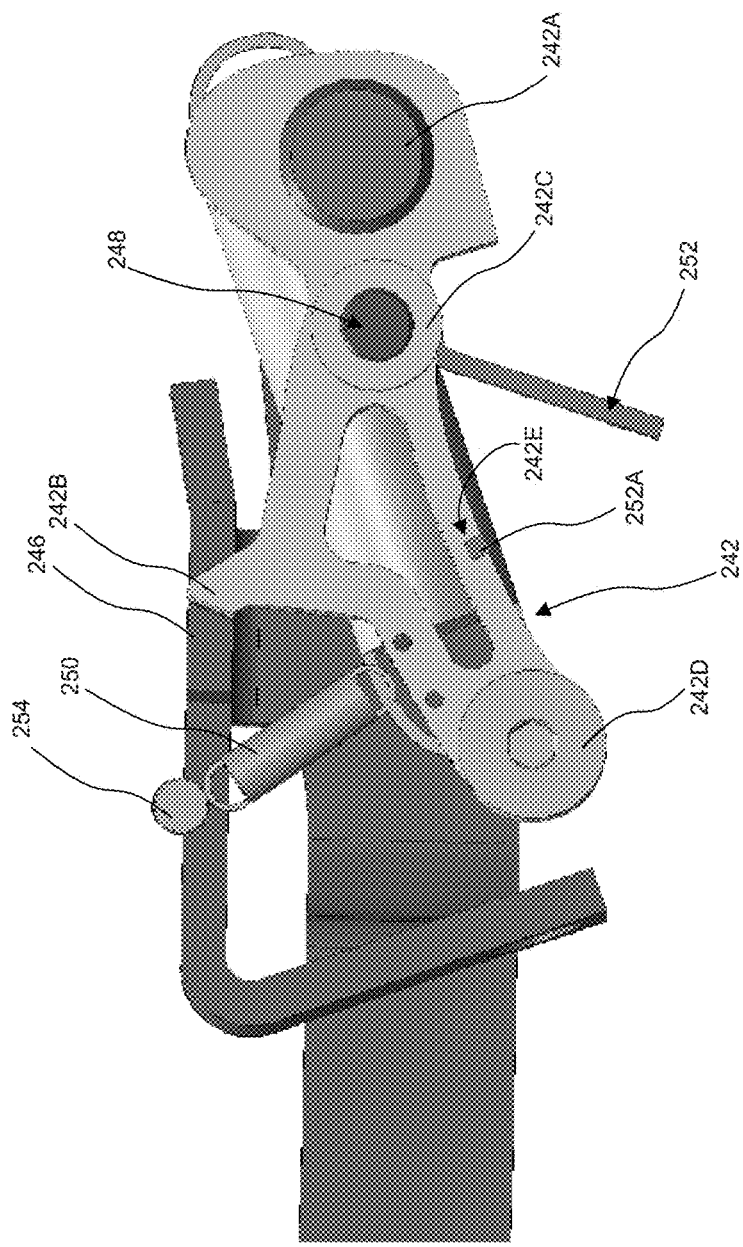
FIG. 2G shows a partial, close-up view of a system for authenticating a user's identity for a biometrically-enabled gun including a counterweighted lever for blocking the movement of a trigger bar of the biometrically-enabled gun, according to some embodiments of the present disclosure.

FIG. 2G shows another deconstructed, close-up view of a system for authenticating a user's identity for the biometrically-enabled gun including a counterweighted lever 242 for blocking the movement of the trigger bar 246 of said biometrically-enabled gun 200, according to some embodiments of the present disclosure. The counterweighted lever 242 may further comprise a leaf-spring notch 242F for receiving the leaf spring 252. The leaf spring 252 may comprise a lever-contacting member 252A, wherein the lever-contacting member 252A may be removably-attached to and/or substantially maintains contact with the leaf-spring notch 242F of the counterweighted lever 242.

Figure 2H:
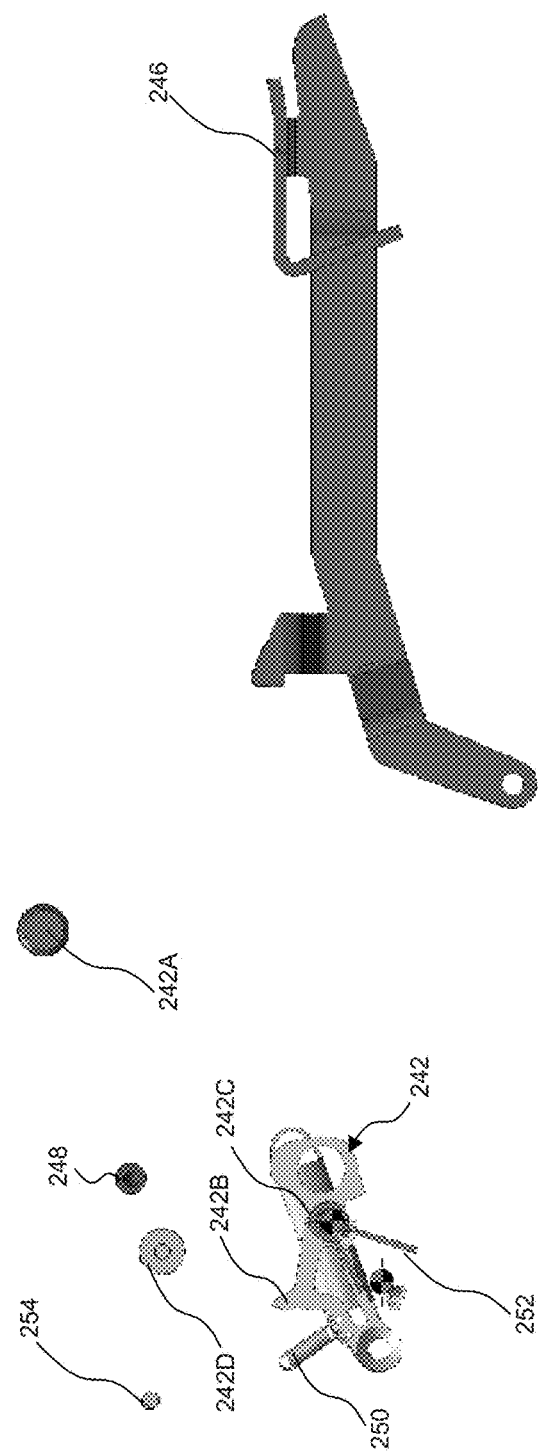
FIG. 2H shows an exploded, partial view of a system for authenticating a user's identity for a biometrically-enabled gun including a counterweighted lever for blocking the movement of a trigger bar of the biometrically-enabled gun, according to some embodiments of the present disclosure.

FIG. 2H shows an exploded, partial view of a system for authenticating a user's identity for a biometrically-enabled gun including the counterweighted lever 242 for blocking the movement of a trigger bar 246 of said biometrically-enabled gun 200, according to some embodiments of the present disclosure.

Figure 2I:
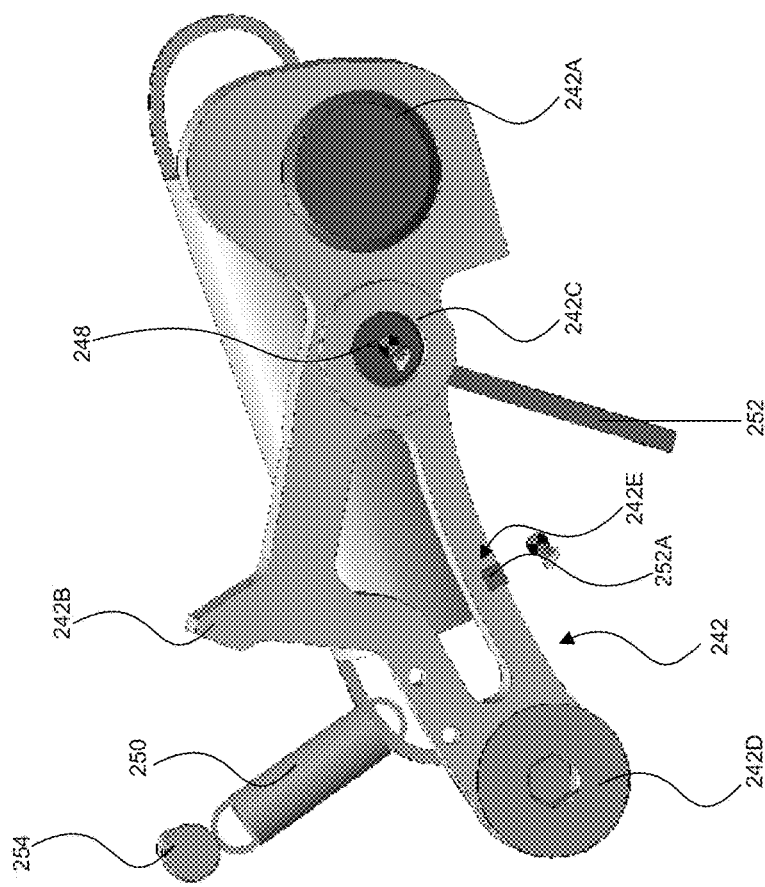
FIG. 2I shows a partial, close-up view of a system for authenticating a user's identity for a biometrically-enabled gun including a counterweighted lever for blocking the movement of a trigger bar of the biometrically-enabled gun, according to some embodiments of the present disclosure.
Figure 2J:
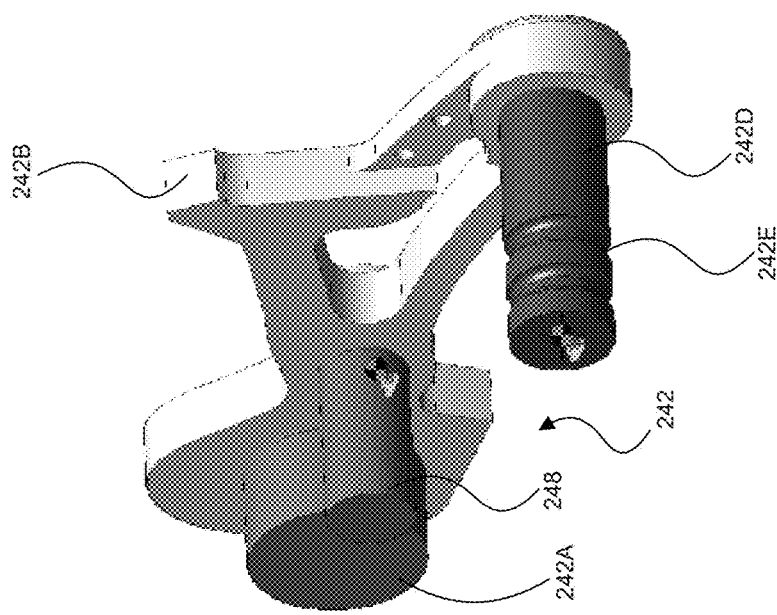
FIG. 2J shows a perspective view of the counterweighted lever for blocking the movement of a trigger bar of the biometrically-enabled gun, according to some embodiments of the present disclosure.

FIG. 2I is a partial, close-up view of a system for authenticating a user's identity for a biometrically-enabled gun including the counterweighted lever 242 for blocking the movement of a trigger bar 246 (not shown) of said biometrically-enabled gun 200, according to some embodiments of the present disclosure.

FIG. 2J shows another perspective view of the counterweighted lever for blocking the movement of a trigger bar of said smart gun, according to some embodiments of the present disclosure. The lever arm 242D may further comprise one or more grooves 242E to attach to an actuator, not shown in FIG. 2J.

Figure 2K:
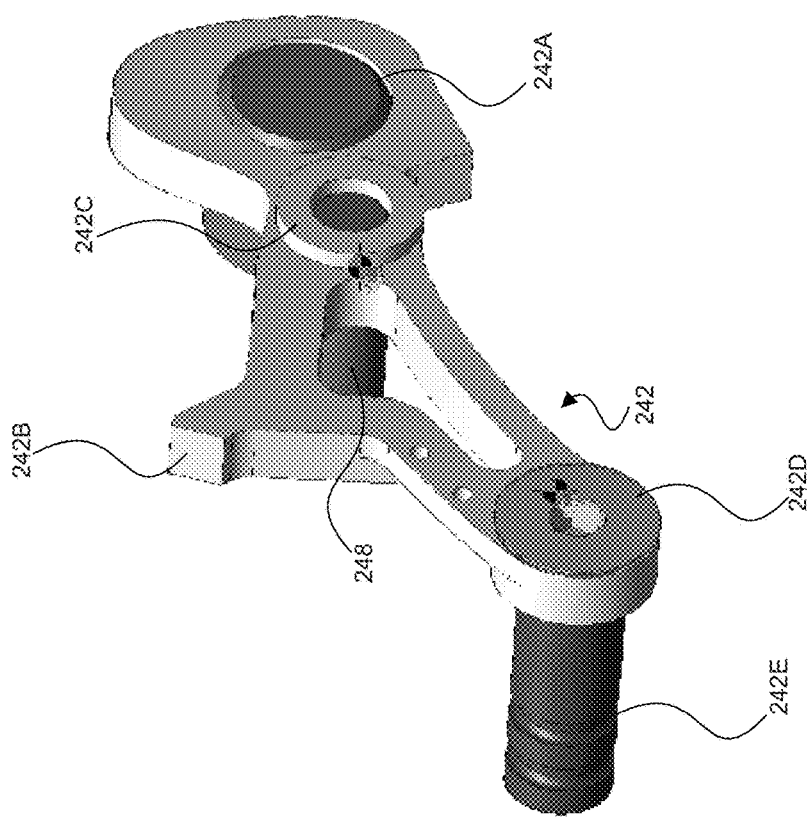
FIG. 2K shows another perspective view of the counterweighted lever for blocking the movement of a trigger bar of the biometrically-enabled gun, according to some embodiments of the present disclosure.

FIG. 2K is another perspective view of the counterweighted lever 242 for blocking the movement of a trigger bar 246 (not shown) of said biometrically-enabled gun 200, according to some embodiments of the present disclosure.

Method for Biometrically-Enabling a Smart Gun

Figure 3:
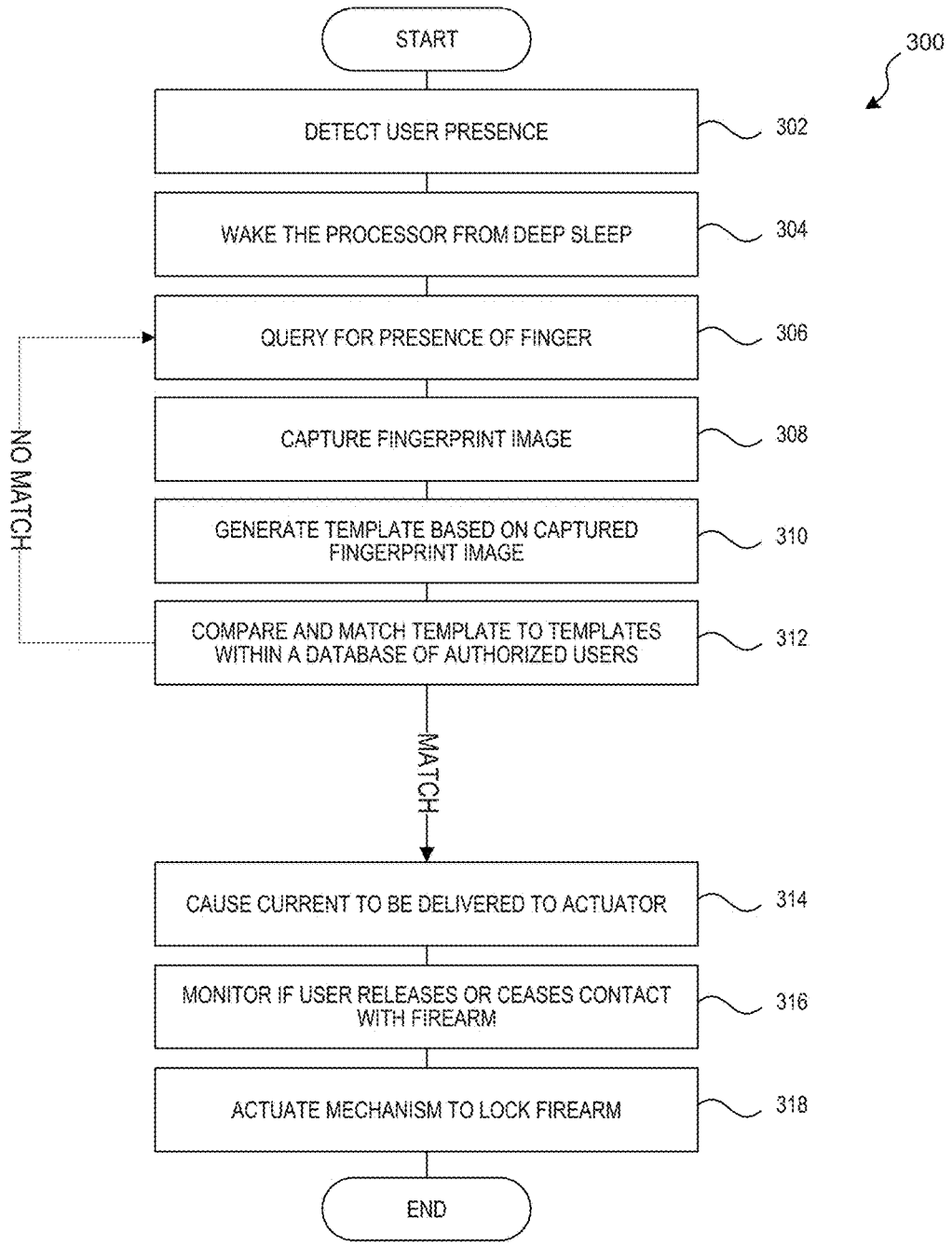
FIG. 3 is a sequence diagram that illustrates a method for biometrically-enabling a gun, according to some embodiments of the present disclosure.

FIG. 3 is a sequence diagram 300 that illustrates a method for biometrically-enabling a smart gun, according to some embodiments of the present disclosure. Various steps of the method may be performed by a processor (e.g., a low-power processor and/or a high-performance processor) of the system 100 executing instructions of a verification program. The processor may be within the biometrically enabled smart gun and the instructions of the verification program may be stored in a database of the biometrically enabled smart gun. In step 302, a presence of a user may be detected. In step 304, a processor may be awoken from deep sleep/power-saving mode. In step 306, the system 100 queries for the presence of the user's finger. In step 308, the system 100 captures the fingerprint image. In step 310, the system 100 generates via an algorithm a template based on the captured fingerprint image. In step 312, the system 100 correspondence between the template and one or more templates within a database of authorized users. If there is not a match, return to step 306. If there is a match, continue to step 314. In step 314, the system 100 delivers current to actuate a mechanism to unlock the firearm. In step 316, the system 100 monitors if the user releases or ceases contact with the firearm. If the user maintains contact with the firearm, the system 100 continue to deliver current to the firearm, enabling the firearm to fire ammunition if needed. In step 318, if the user releases or ceases contact with the firearm, the system 100 optionally ceases current delivery to actuate mechanism to unlock firearm, returning the system 100 to step 302.

In step 302, the verification program may detect a presence of a user. One or more sensors of the gun may detect, for example, an electric current change due to contact with a user, a pressure applied to the gun, etc. The one or more sensors may transmit the detected data to, for example, a low-power processor. The low-power processor may operate when a high-power processor is in sleep/power-saving mode. The low-power processor may determine, based on the detected data, a user's presence. For example, the low-power processor may determine that data received from a sensor on a handle of the gun indicates that a user is in contact with the handle.

In step 304, the verification program may wake the processor 108 from deep sleep/power-saving mode. In response to determining that a user is in contact with the gun, the low-power processor may initiate waking of another processor (e.g., a high-power processor). The low-power processor may initiate waking of another processor by transmitting a signal to the another processor. In an embodiment, the low-power processor may enter a sleep/power-saving mode after waking the another processor. In another embodiment, the low-power processor may operate in conjunction with the another processor. For example, the low-power processor may continuously monitor user contact with the gun, as discussed below with reference to step 318.

In step 306, the verification program may query for the presence of the user's finger. In an embodiment, a processor may request data from the fingerprint sensor 122 (FIG. 1) to determine if a fingerprint is available. For example, the processor may cause an electrical current to be sent to the fingerprint sensor 122 to initiate a fingerprint capture.

In step 308, the verification program may capture a fingerprint. The fingerprint sensor 122 may capture an image of a fingerprint of a user and transmit data associated with the fingerprint of the user to a database.

In step 310, the verification program generates a template based on the captured fingerprint. In an embodiment, the template may be, for example, a vector of data points or a matrix of data points associated with the captured fingerprint. For example, each data point of the vector may indicate a particular location associated with a surface of the fingerprint sensor 122 and each value of the vector may indicate an intensity (e.g., a lightness or darkness detected in the location). In another example, the matrix of data points may be data associated with a captured image of a fingerprint having a plurality of pixels associated with a particular location of the surface of the fingerprint sensor 122. In another example, the template may be the result of a mathematical process that generates a unique hash representing the captured image.

In step 312, the verification program determines a correspondence between the template and one or more templates within a database of authorized users. The processor may execute a matching algorithm to determine if data associated with the captured fingerprint matches one or more templates within a database of authorized users. If the processor does not identify a match, the processor may, for example, repeat step 306. If the processor identifies a match, the processor may proceed to step 314.

In step 314, the verification program causes an actuator to change a position of a counterweighted lever such that the counterweighted lever does not obstruct movement of the trigger bar. The actuator may be, for example, a shape memory device, solenoid, electric motor (e.g., a direct current motor, electrostatic motor, and/or servo motor), electromagnet, piezoelectric actuator, voice coil, or any combination thereof. In a preferred embodiment, the actuator may be a shape memory device including, for example, shape memory alloy. In response to identifying a match, the processor may cause the driver 106 (FIG. 1) to deliver an electric current to the actuator 120 (e.g., shape memory alloy) to cause the actuator to change a position of the counterweighted lever 142 such that the counterweighted lever does not obstruct movement of the trigger bar of the gun. When current is applied, the shape memory device may relax (i.e. return to a pre-deformed shape), which may cause the counterweighted lever to not obstruct the trigger bar.

In step 316, the verification program monitors user contact with the firearm. In an embodiment, the low-power processor may continuously monitor user contact with the gun. In another embodiment, the high-power processor may monitor user contact with the gun. In response to not detecting a user in contact with the gun (e.g., a user not in contact with the fingerprint sensor 122), the processor may cause the actuator to change position of the counterweight to obstruct the trigger bar, as discussed below with reference to step 318.

In step 318, the verification program may cause the actuator to change the position of the counterweighted lever such that the counterweighted lever obstructs movement of the trigger bar. For example, if the actuator is a memory shape alloy, the processor may cause the driver 106 to terminate delivery of electric current to the memory shape alloy. By terminating electric current through the memory shape alloy, the temperature of the memory shape alloy may be reduced and the memory shape alloys may return to a deformed shape, and thus, allow the counterweighted lever to return a position obstructing motion of the trigger bar.

Connecting a Biometrically-Enabled Gun to Another Device

Figure 4A:
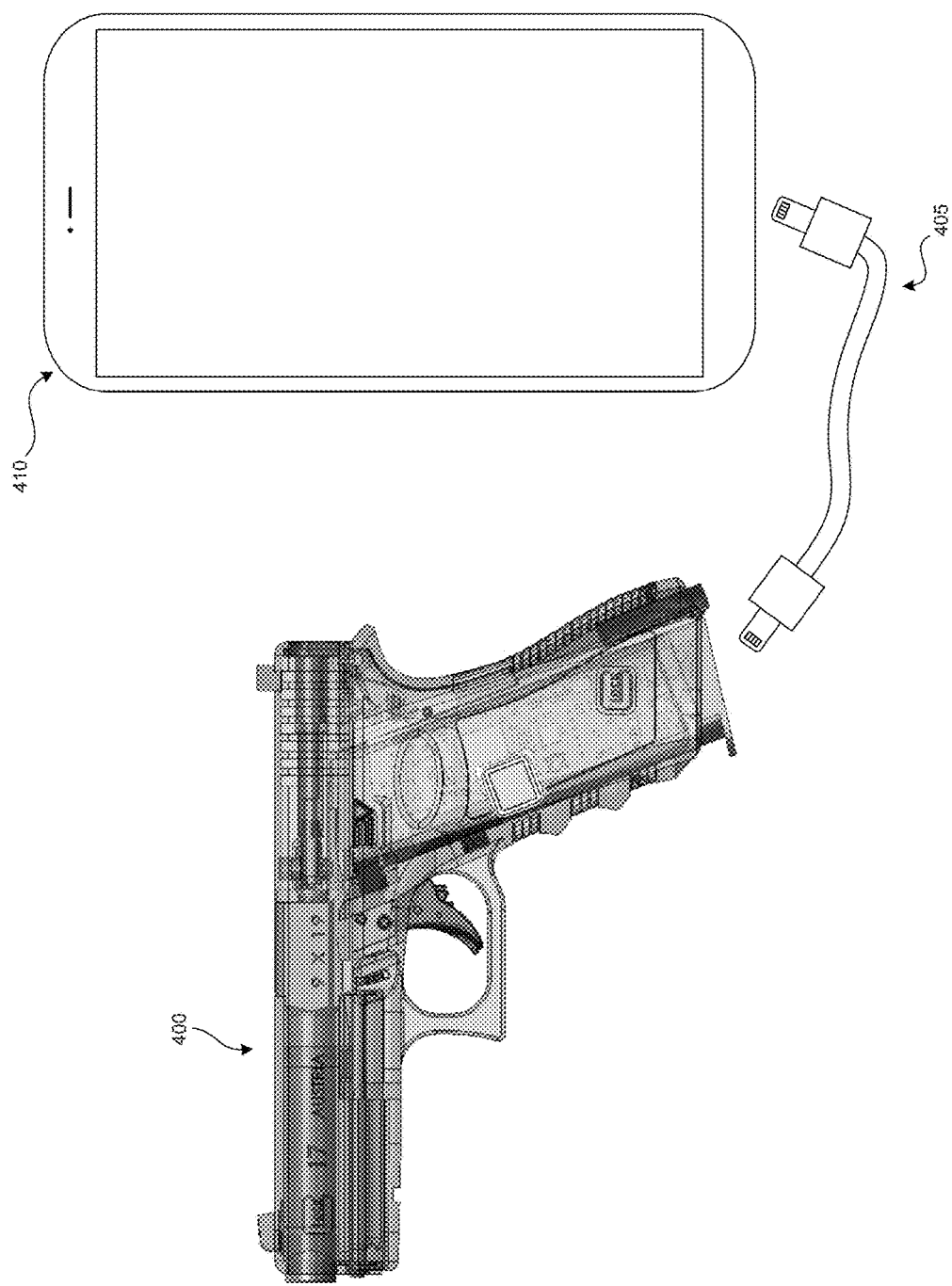
FIG. 4A is an illustration of connecting the biometrically-enabled gun to a computing device, according to embodiments of the present invention.

FIG. 4A is an illustration of connecting a biometrically-enabled gun 400 to a computing device 410, according to embodiments of the present invention. The biometrically-enabled gun 400 may include various elements of the system 100 (FIG. 1). The computing device 410 may be a mobile device, laptop computer, server, or any other computing device. A connection mechanism 405 may be connected to the processor (or plurality of processors) to facilitate communication between the biometrically-enabled gun 400 and the computing device 410 where communicating includes transferring data associated with one or more authorized users. The connection mechanism 405 can include any wired or wireless connection, or combination of wired and/or wireless connections. Examples of wired connections include a universal serial bus (USB) connector (e.g., 1.0, 2.0, 3.0, 3.1, type-c, mini, micro, etc.), Apple Lightning® connector, or any other computer bus or combination of computer buses. Examples of wireless connections include one or more connections through a personal area network (PAN) device, local area network (LAN) device, wide area network (WAN) device, or any combination of wireless devices. A wired or wireless connection mechanism 405 may connect to a computer bus port (e.g., serial bus connector port 118 of FIG. 1) of the biometrically-enabled gun 400. The connection mechanism 405 can operate using standardized communication protocols. Communicating via the connection mechanism 405 can include transmitting and/or receiving data from the biometrically-enabled gun 400 to the computing device 410. In an embodiment, the connection mechanism 405 may also serve as a charging mechanism, such as, for example, a USB charger.

Figure 4B:
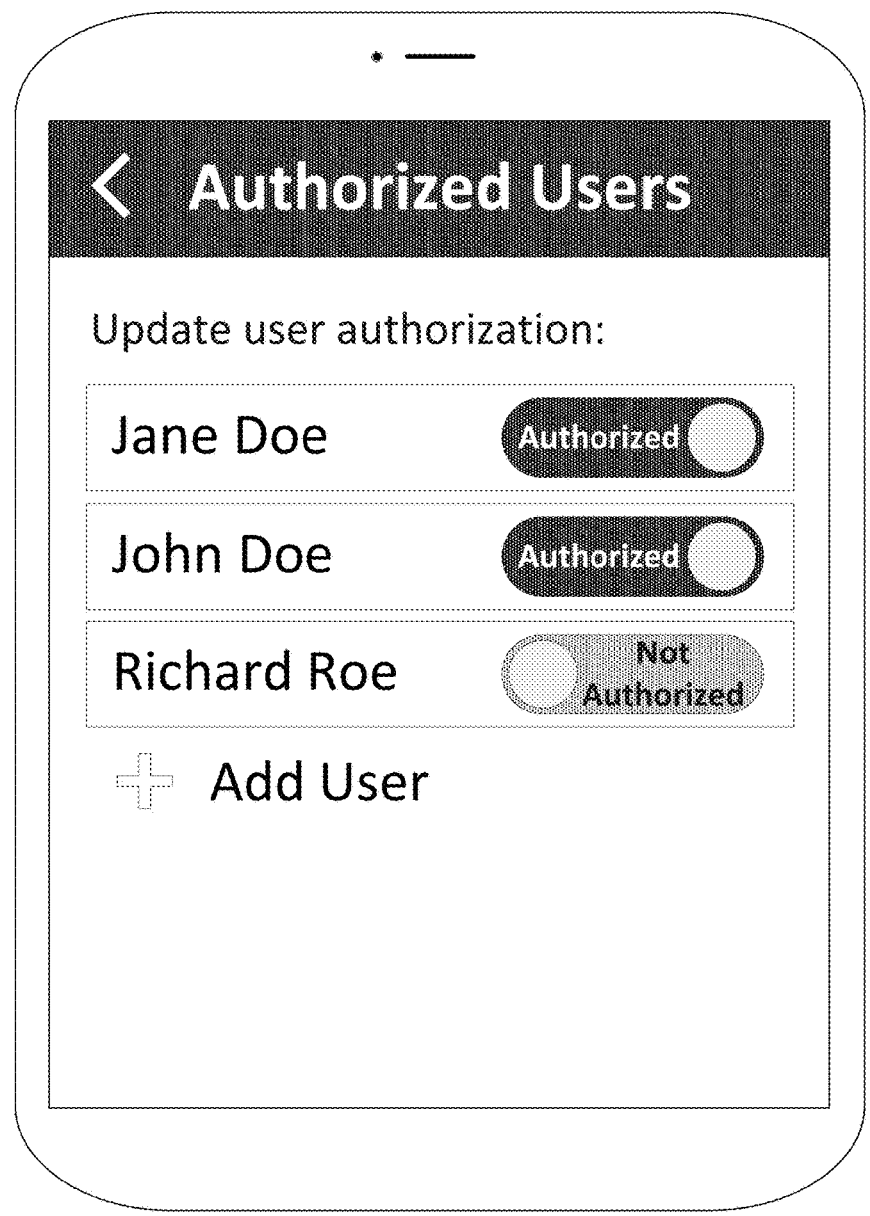
FIG. 4B is an illustration of using a computing device to manage authorized user of the biometrically-enabled gun, according to embodiments of the present invention.

FIG. 4B is an illustration of using a computing device 410 to manage authorized user of the biometrically-enabled gun 400, according to embodiments of the present invention. In an embodiment, the computing device 410 may be a mobile device (e.g., a mobile telephone, tablet, etc.).

A mobile application may be configured to manage authorized users of the biometrically-enabled gun 400 on the mobile device. For example, the mobile application may provide a user, via a graphical user interface of the mobile device, with information regarding authorized users. The mobile application may receive inputs, via a touchscreen display of the mobile device, indicating whether a stored user profile is authorized or not authorized to operate the biometrically-enabled gun 400. For example, in FIG. 4B, Jane Doe and John Doe are authorized to use the biometrically-enabled gun 400 and Richard Roe is not authorized to use the biometrically-enabled gun 400. A user may indicate, via the touchscreen display of the user device, that Richard Doe is authorized to use the biometrically-enabled gun 400 by changing a setting adjacent to Richard Doe's name on the touchscreen display.

A user may add additional users via the touchscreen display by, for example, touching a plus sign adjacent to "add user" and inputting information, such as, for example, a name and a fingerprint of a new user. A fingerprint may be added by, for example, having the new user touch the fingerprint sensor 122 (FIG. 1) of the biometrically-enabled gun 400 and/or by touching a fingerprint sensor of the mobile device.

Embodiments of the present invention include utilizing the computing device 410 for management of a plurality of biometrically-enabled guns 400. For example, a plurality of biometrically-enabled guns 400 may be charged and simultaneously programmed from a software user interface on the computing device 410. Mass management of biometrically-enabled guns may permit organizations (e.g., the military) to connect to an existing database of employees and associate a fingerprint with them. A management organization may select a pre-determined group of users and upload all of the users to the biometrically-enabled guns 400 simultaneously.

In another embodiment, a magazine shaped insert may be used to enroll new authorized users and/or charge a biometrically-enabled gun 400. An insert having a shape of a magazine may be inserted into the magazine well of the biometrically-enabled gun 400. An surface of the insert may include a connection mechanism 405 to interface with the one or more electronic components of the biometrically-enabled gun 400 (e.g., the processor, database, energy storage device, etc.). The insert may enable charging of an energy storage device (e.g., a battery) of the biometrically-enabled gun 400 via a charging connections inside of the firearm instead of an outer edge. Charging the biometrically-enabled gun 400 via charging connection inside the firearm may protect the biometrically-enabled gun 400 from electrical malfunction associated with exposure of electronics to the environment. The insert may be used to enroll and/or remove authorized users from the biometrically-enabled gun 400. A screen may be included on the magazine insert to provide a user interface offering a much more intuitive and informative user experience.

Computer

Figure 5:
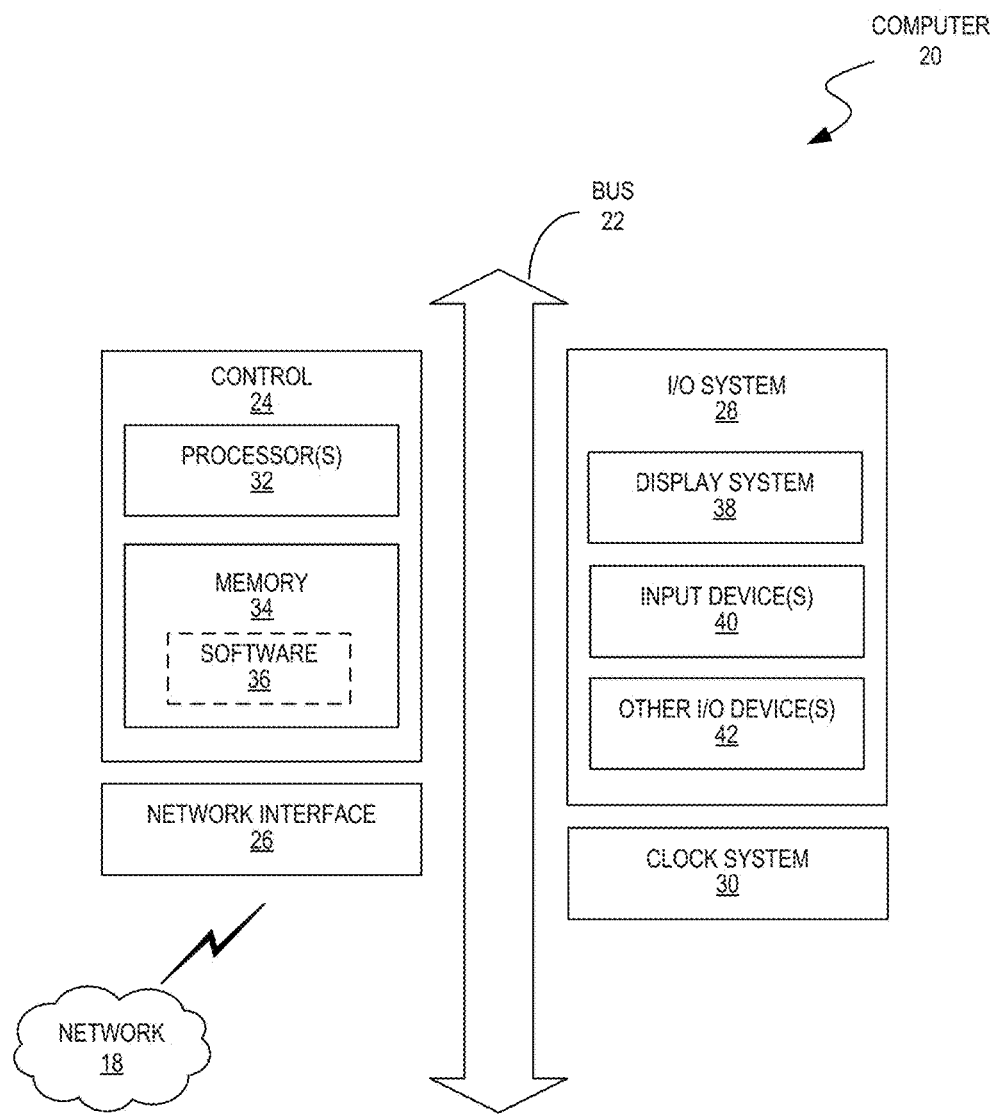
FIG. 5 is a block diagram illustrating a computer operable to implement the disclosed technology, according to some embodiments of the present disclosure.

FIG. 5 is a block diagram of a computer 20 of system 10 operable to implement the disclosed technology according to some embodiments of the present disclosure. The computer 20 may be specifically designed to carry out features of system 100 (FIG. 1). For example, the computer 20 may be a system-on-chip (SOC), a single-board computer (SBC) system, a dual processor computing system, or combinations thereof integrated into a biometrically-enabled gun. In another example, the computer 20 may be a system-on-chip (SOC), a single-board computer (SBC) system, a dual processor computing system, or combinations thereof configured to communicate with and/or direct various components of a biometrically-enabled gun.

The computer 20 may be a standalone device or part of a distributed system that spans multiple networks, locations, machines, or combinations thereof. In some embodiments, the computer 20 operates as a server or a client device in a client-server network environment, or as a peer machine in a peer-to-peer system. In some embodiments, the computer 20 may perform one or more steps of the disclosed embodiments in real time, near real time, offline, by batch processing, or combinations thereof.

As shown in FIG. 4, the computer 20 includes a bus 22 that is operable to transfer data between hardware components. These components include a control 24 (e.g., processing system), a network interface 26, an input/output (I/O) system 28, and a clock system 30. The computer 20 may include other components that are not shown nor further discussed for the sake of brevity. One having ordinary skill in the art will understand any hardware and software that is included but not shown in FIG. 4.

The control 24 includes one or more processors 32 (e.g., central processing units (CPUs)), application specific integrated circuits (ASICs), and/or field programmable gate arrays (FPGAs), and memory 34 (which may include software 36). For example, the memory 34 may include volatile memory, such as random-access memory (RAM) and/or non-volatile memory, such as read-only memory (ROM). The memory 34 can be local, remote, or distributed.

A software program (e.g., software 36), when referred to as "implemented in a computer-readable storage medium," includes computer-readable instructions stored in the memory (e.g., memory 34). A processor (e.g., processor 32) is "configured to execute a software program" when at least one value associated with the software program is stored in a register that is readable by the processor. In some embodiments, routines executed to implement the disclosed embodiments may be implemented as part of operating system (OS) software (e.g., Microsoft Windows® and Linux®) or a specific software application, component, program, object, module, or sequence of instructions referred to as "computer programs."

As such, the computer programs typically comprise one or more instructions set at various times in various memory devices of a computer (e.g., computer 20), which, when read and executed by at least one processor (e.g., processor 32), will cause the computer to perform operations to execute features involving the various aspects of the disclosed embodiments. In some embodiments, a carrier containing the aforementioned computer program product is provided. The carrier is one of an electronic signal, an optical signal, a radio signal, or a non-transitory computer-readable storage medium (e.g., memory 34).

The network interface 26 may include a modem or other interfaces (not shown) for coupling the computer 20 to other computers over the network 18. The I/O system 28 may operate to control various I/O devices including peripheral devices, such as a display system 38 (e.g., a monitor or touch-sensitive display) and one or more input devices 40 (e.g., a keyboard and/or pointing device). Other I/O devices 42 may include, for example, a disk drive, printer, scanner, or the like. Lastly, the clock system 30 controls a timer for use by the disclosed embodiments.

Operation of a memory device (e.g., memory 34), such as a change in state from a binary one (1) to a binary zero (0) (or vice versa) may comprise a visually perceptible physical change or transformation. The transformation may comprise a physical transformation of an article to a different state or thing. For example, a change in state may involve accumulation and storage of charge or a release of stored charge. Likewise, a change of state may comprise a physical change or transformation in magnetic orientation or a physical change or transformation in molecular structure, such as a change from crystalline to amorphous or vice versa.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms and that the disclosure applies equally, regardless of the particular type of machine or computer-readable media used to actually effect the embodiments.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the concepts disclosed herein. Thus, the description is to be regarded as illustrative instead of limiting.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A method comprising:
   querying a fingerprint sensor fastened to a gun for a presence of a finger of a user;
   capturing, by the fingerprint sensor, data associated with a fingerprint of the finger of the user;
   generating, by a processor, a captured template based on the captured data;
   determining, by the processor, a correlation between the captured template and an authorized user template stored in a database;
   in response to determining a correlation between the captured template and the authorized user template exceeding a threshold, causing an actuator to position a counterweighted lever such that the counterweighted lever does not obstruct a trigger bar of the gun;
   wherein the trigger bar is configured to connect a trigger to a striker of the gun;
   monitoring, by the processor, the user's contact with the gun; and
   in response to detecting a lapse in contact with the gun, causing the actuator to position the counterweighted lever such that the counterweighted lever obstructs the trigger bar of the gun.

2. The method of claim 1, further comprising:
   detecting, by a sensor of the biometrically-enabled gun, a presence of a user; and
   in response to detecting the presence of the user, waking the processor from a power-saving mode.

3. The method of claim 1, wherein the actuator is affixed to the counterweighted lever such that changes in shape of the actuator cause the counterweighted lever to move about an axis.

4. The method of claim 1, wherein a deformed shape of the actuator causes a portion of the counterweighted lever to obstruct movement of the trigger bar; and
   wherein a relaxed shape of the actuator causes a portion of the counterweighted lever to not obstruct movement of the trigger bar.

5. The method of claim 1, wherein applying an electric current to the actuator causes the actuator to have a first shape, and wherein terminating an electric current to the actuator causes the actuator to have another shape.

6. The method of claim 1, wherein heating the actuator causes the actuator to have a first shape, and wherein terminating heating of the actuator causes the actuator to have another shape.

7. The method of claim 1, wherein the actuator comprises at least one of:
   a shape memory device;
   a solenoid;
   an electric motor;
   an electromagnet;
   a piezoelectric actuator; and
   a voice coil.

8. The method of claim 7, wherein the shape memory device is composed of at least one of:
   a shape memory alloy; and
   a shape memory polymer.

9. The method of claim 8, wherein the shape memory alloy comprises nickel, titanium, copper, aluminum, nickel, zinc, gold, manganese, silicon, tin, platinum, iron, niobium, or any combination thereof.

10. The method of claim 9, wherein applying an electric current to the shape memory alloy causes the shape memory alloy to have first shape, and wherein terminating an electric current to the memory shape alloy causes the memory shape alloy to have another shape.

11. The method of claim 9, wherein the first shape is associated with an austenite crystal lattice formation of the shape memory alloy, and wherein the another shape is associated with a martensite crystal lattice formation of the shape memory alloy.

12. The method of claim 1, wherein causing the actuator to position the counterweighted lever such that the counterweighted lever does not obstruct the trigger bar of the gun includes delivering an electric current to the actuator.

13. The method of claim 12, further comprising:
   a temperature sensor detecting an ambient temperature; and
   adjusting the electric current delivered to the actuator based on the detected ambient temperature.

14. The method of claim 1, wherein causing the actuator to position the counterweighted lever such that the counterweighted lever obstructs the trigger bar of the gun includes terminating delivery of an electric current to the actuator.

15. The method of claim 1, further comprising:
   receiving an input via an enrollment button;
   capturing, by the fingerprint sensor, data associated with a fingerprint of a finger of a user;
   generating the authorized user template based on the captured data; and
   storing the authorized user template in the database.

16. The method of claim 1, further comprising:
   connecting to another computing device;
   receiving, from the another computing device, the authorized user template; and
   storing the authorized user template in the database.

17. The method of claim 1, further comprising:
   retrieving, by the processor, a serial number from a serial number integrated circuit within the gun;
   in response to identifying a match between the serial number from the serial number integrated circuit and a serial number of a printed circuit board, retrieving the authorized user template stored in the database of the printed circuit board.

18. The method of claim 1, further comprising:
   in response to detect an imminent low energy condition, performing the following:
      initiating a haptic feedback device;
      initiating a light emitting diode;
      shutting down one or more computing components;
      releasing the actuator from the counterweight lever; or
   any combination thereof.

19. The method of claim 1, further comprising:
   querying a secondary biometric device for biometric information of the user; and
   capturing, by the secondary biometric device, data associated with the biometric information of the user.

20. A method comprising:
   querying a fingerprint sensor fastened to a gun for a presence of a finger of a user;
   in response to determining that the finger of the user is not present, querying a secondary biometric device for biometric information of the user;
   capturing, by the secondary biometric device, data associated with the biometric information of the user;
   determining, by the processor, a correlation between the captured data and authorized user data stored in a database;

in response to determining a correlation between the captured data and the authorized user data exceeding a threshold, causing an actuator to position a counterweighted lever such that the counterweighted lever does not obstruct a trigger bar of the gun;

wherein the trigger bar is configured to connect a trigger to a striker of the gun;

monitoring, by the processor, the user's contact with the gun; and in response to detecting a lapse in contact with the gun, causing the actuator to position the counterweighted lever such that the counterweighted lever obstructs the trigger bar of the gun.

21. The method of claim 20, wherein the secondary biometric device includes:
a retinal scanner;
an iris scanner;
a voice identification device;
a radio frequency identification device;
a grip recognition device;
a palm vein scanner;
a biological sample testing device; or
any combination thereof.

22. The method of claim 20, wherein the secondary biometric device is a glove worn by a user configured to retrieve the biometric information of the user.

23. A system for comprising:
a counterweighted lever configured to move about an axis, wherein a force draws the counterweighted lever toward a first position obstructing a trigger bar of a gun;
an actuator fastened to the counterweighted lever, the actuator configured to overcome the force to draw the counterweighted lever toward a second position not obstructing the trigger bar of the gun;
wherein the trigger bar is configured to connect a trigger to a striker of the gun;
a processor executing instructions in a database to perform a method comprising: querying a fingerprint sensor fastened to the gun for a presence of a finger of a user;
capturing, by the fingerprint sensor, data associated with a fingerprint of the finger of the user;
generating a captured template based on the captured data;
determining a correlation between the captured template and an authorized user template stored in the database;
in response to determining a correlation between the captured template and the authorized user template exceeding a threshold, causing the actuator to overcome the force;
monitoring the user's contact with the gun; and
in response to detecting a lapse in contact with the gun, deactivating the actuator such that the counterweighted lever returns to the first position obstructing the trigger bar of the gun.

24. The system of claim 23, wherein the actuator is a shape memory device composed of shape memory alloy.

25. The system of claim 23, further comprising:
a driver configured to deliver an electric current to the actuator.

26. The system of claim 23, further comprising:
delivering an electric current, by a driver initiated by the processor, to causing the actuator to overcome the force,
wherein causing the actuator to overcome the force comprising altering the crystal lattice structure of a material of the actuator.

27. The system of claim 23, further comprising:
a secondary biometric verification device.

28. The system of claim 23, further comprising:
querying a secondary biometric device for biometric information of the user; and
capturing, by the secondary biometric device, data associated with the biometric information of the user.

29. The system of claim 23, further comprising:
a user presence sensing device including:
a proximity sensor element;
a capacitive proximity sensor;
an accelerometer;
a user presence button; or
any combination thereof.

30. The system of claim 29, further comprising:
detecting, by the user presence sensing device, a presence of a user; and
in response to detecting the presence of the user, waking the processor from a power-saving mode.

31. The system of claim 23, further comprising:
an integral serial number integrated controller.

32. The system of claim 31, further comprising:
retrieving a serial number from the integral serial number integrated controller;
in response to identifying a match between the serial number from the integral serial number integrated controller and a pre-determined serial number associated with the gun, retrieving the authorized user template stored in the database of the printed circuit board.

33. The system of claim 23, further comprising:
a haptic feedback device.

34. The system of claim 33, further comprising:
activating the haptic feedback device in response to:
determining, based on available energy storage detected, the charge state of the battery;
capturing, by the fingerprint sensor, data associated with the fingerprint of the finger of the user;
capturing, by a secondary biometric device, data associated with biometric information of the user;
receiving an input via an authorized user enrollment button;
storing the authorized user template in the database;
causing the actuator to overcome the force;
connecting the gun to another computing device;
receiving an input from another computing device;
or any combination thereof.

35. The system of claim 23, further comprising:
a magazine configured for insertion into the gun comprising:
a connection mechanism configured to interface with the one or more electronic components of the gun;
an energy storage device configured to charge an energy storage device of the gun;
a touchscreen display; or
any combination thereof.

* * * * *